(12) United States Patent
Kuon et al.

(10) Patent No.: US 12,366,890 B2
(45) Date of Patent: Jul. 22, 2025

(54) DISPLAY DEVICE HAVING COVER GLASS

(71) Applicant: LG Display Co., Ltd., Seoul (KR)

(72) Inventors: Ikhyun Kuon, Paju-si (KR); Chan Park, Paju-si (KR); Yongsoo Kim, Paju-si (KR); Eungchul Park, Paju-si (KR); Moongoo Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 87 days.

(21) Appl. No.: 17/476,095

(22) Filed: Sep. 15, 2021

(65) Prior Publication Data
US 2022/0091637 A1 Mar. 24, 2022

(30) Foreign Application Priority Data
Sep. 18, 2020 (KR) .................. 10-2020-0120483

(51) Int. Cl.
*G06F 1/16* (2006.01)
*B32B 3/30* (2006.01)
*B32B 17/10* (2006.01)

(52) U.S. Cl.
CPC .............. *G06F 1/1656* (2013.01); *B32B 3/30* (2013.01); *B32B 17/10* (2013.01); *B32B 2255/26* (2013.01); *B32B 2457/20* (2013.01)

(58) Field of Classification Search
CPC .. B32B 3/26; B32B 3/266; B32B 3/30; B32B 17/00; B32B 2457/20; G06F 1/1652; G06F 1/1656; G06F 9/301; G06F 1/1616–162; H04M 1/9214; H04M 1/0268–0269; H10K 50/84; H10K 2102/311; H10K 77/10–111; G02F 1/33305; G09F 9/301
See application file for complete search history.

(56) References Cited

U.S. PATENT DOCUMENTS

| | | | |
|---|---|---|---|
| 9,429,999 B2 | 8/2016 | Lee et al. | |
| 10,020,462 B1* | 7/2018 | Ai | H10K 50/841 |
| 10,056,443 B2 | 8/2018 | Shyu et al. | |
| 10,295,818 B2 | 5/2019 | Nam et al. | |

(Continued)

FOREIGN PATENT DOCUMENTS

| | | |
|---|---|---|
| KR | 10-2015-0017819 A | 2/2015 |
| KR | 10-2015-0061965 A | 6/2015 |

(Continued)

OTHER PUBLICATIONS

Petrovan, Bogdan. "How do folding screens actually work?", https://www.androidauthority.com/how-do-folding-screens-actually-work-3164822/ (Year: 2022).*

(Continued)

*Primary Examiner* — Laura C Powers
*Assistant Examiner* — Rebecca L Grusby
(74) *Attorney, Agent, or Firm* — Birch, Stewart, Kolasch & Birch, LLP

(57) ABSTRACT

A display device having a cover glass according to an example of the present disclosure includes a display panel, and a cover glass located on the display panel and including a folding area and a non-folding area, wherein the cover glass can include a glass layer including a glass having one or more slits disposed in the folding area in a width direction of the glass and formed in a shape passing through the glass in a height direction thereof, and a filler filled in each slit.

12 Claims, 20 Drawing Sheets

(56) References Cited

U.S. PATENT DOCUMENTS

| | | | |
|---|---|---|---|
| 10,522,060 B2 | 12/2019 | Park et al. | |
| 2015/0043174 A1* | 2/2015 | Han | G02F 1/13452 |
| | | | 428/156 |
| 2016/0190522 A1* | 6/2016 | Lee | H10K 50/8426 |
| | | | 257/40 |
| 2018/0217639 A1* | 8/2018 | Jones | G06F 1/1618 |
| 2018/0356859 A1* | 12/2018 | Hamburgen | G06F 1/1626 |
| 2020/0313111 A1* | 10/2020 | Kim | G06F 1/1626 |
| 2021/0090475 A1* | 3/2021 | Wang | G06F 1/1656 |
| 2021/0216100 A1* | 7/2021 | Smeeton | G06F 1/1652 |
| 2021/0247804 A1* | 8/2021 | Ha | G09F 9/301 |
| 2021/0251090 A1* | 8/2021 | Ha | G06F 1/1652 |
| 2022/0006038 A1* | 1/2022 | Park | H10K 59/38 |
| 2022/0011813 A1* | 1/2022 | Kim | G06F 1/1616 |
| 2022/0043187 A1* | 2/2022 | Choi | H04M 1/0216 |
| 2022/0063256 A1* | 3/2022 | Kim | G06F 1/1637 |
| 2022/0103672 A1* | 3/2022 | Jung | G02F 1/133331 |
| 2022/0198964 A1* | 6/2022 | Cho | H10K 50/844 |

FOREIGN PATENT DOCUMENTS

| | | | | |
|---|---|---|---|---|
| KR | 10-2018-0036304 A | | 4/2018 | |
| KR | 10-2018-0036904 A | | 4/2018 | |
| KR | 10-2019-0081341 A | | 7/2019 | |
| KR | 10-2019-0127161 A | | 11/2019 | |
| KR | 10-2039496 B1 | | 11/2019 | |
| KR | 20200030939 A | * | 3/2020 | |
| WO | WO 2017/177127 A1 | | 10/2017 | |
| WO | WO-2020107630 A1 | * | 6/2020 | G02F 1/133305 |

OTHER PUBLICATIONS

Machine translation of KR 2020-0030939 via EPO (Year: 2020).*
Machine translation of WO 2020/107630 via EPO (Year: 2020).*

* cited by examiner

【Fig. 1】
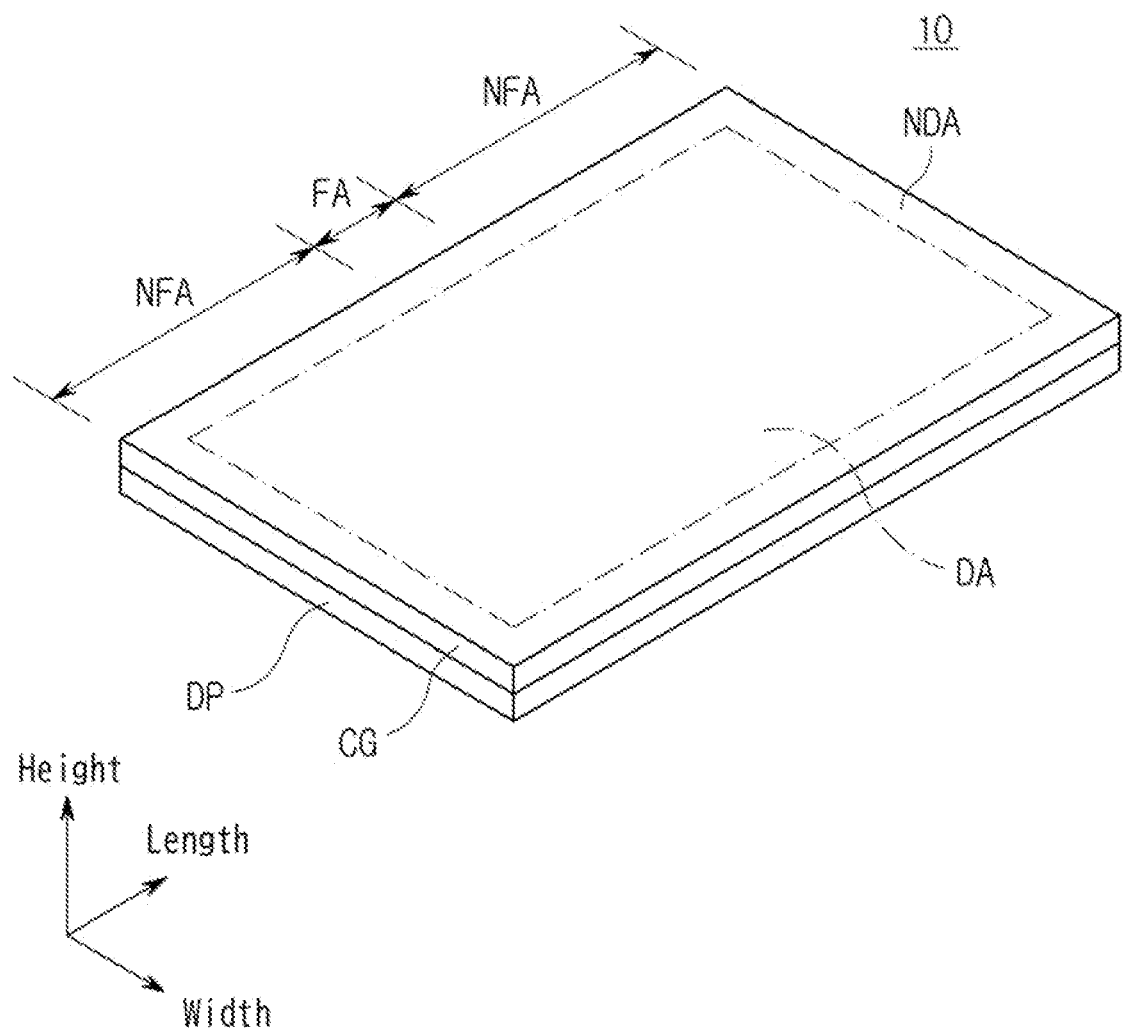

[Fig. 2]
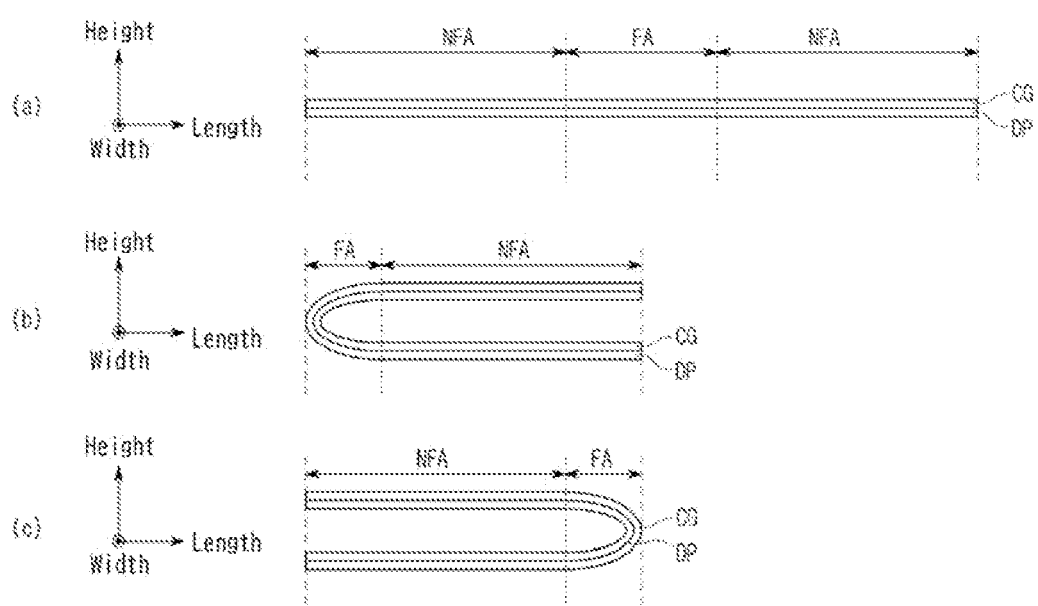

[Fig. 3]
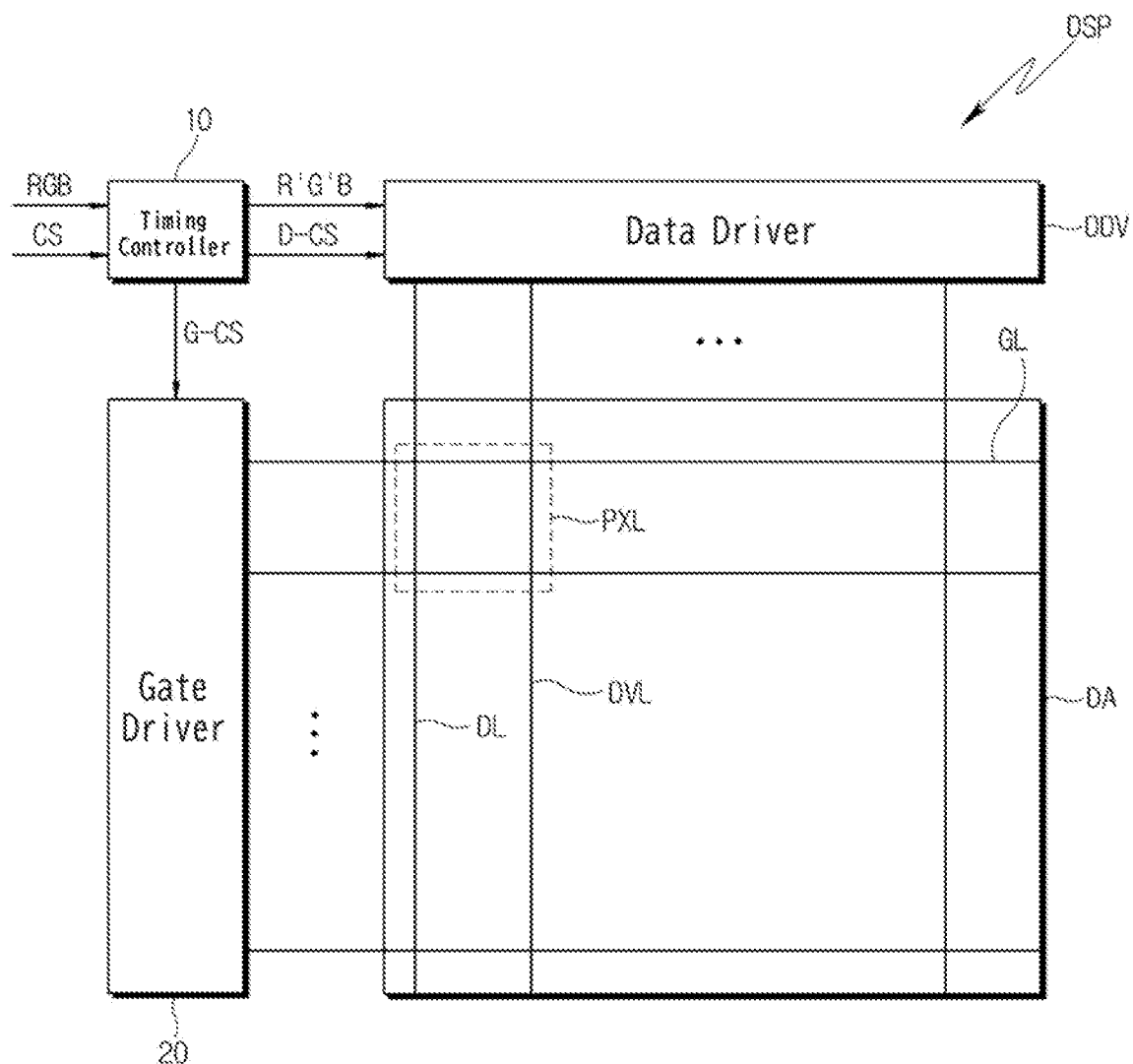

[Fig. 4]
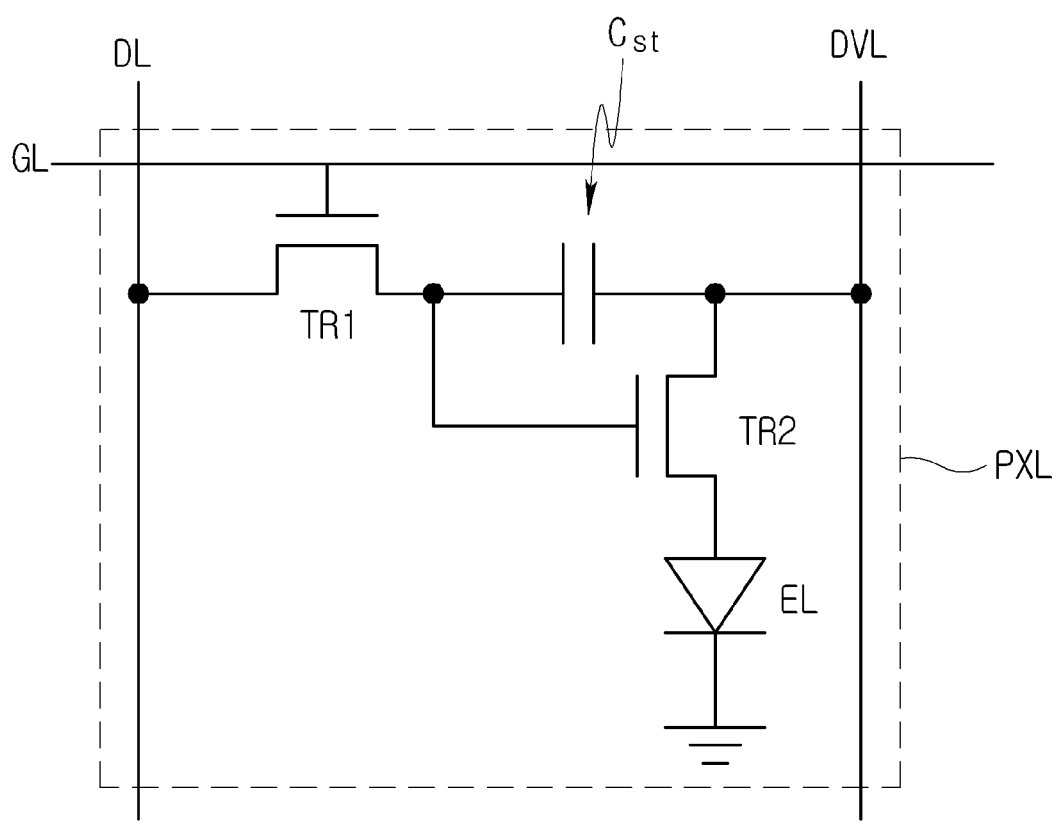

[Fig. 5A]
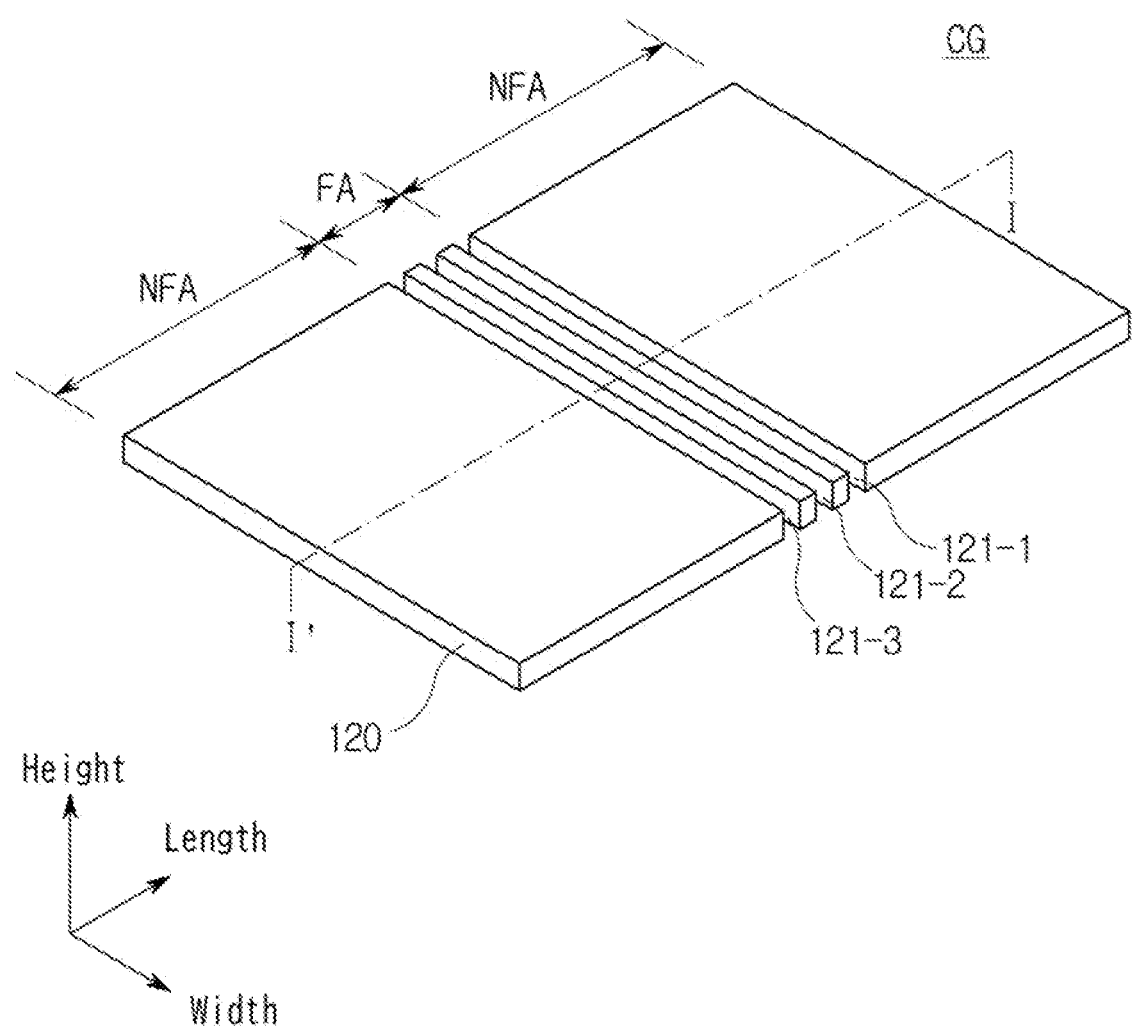

[Fig. 5B]
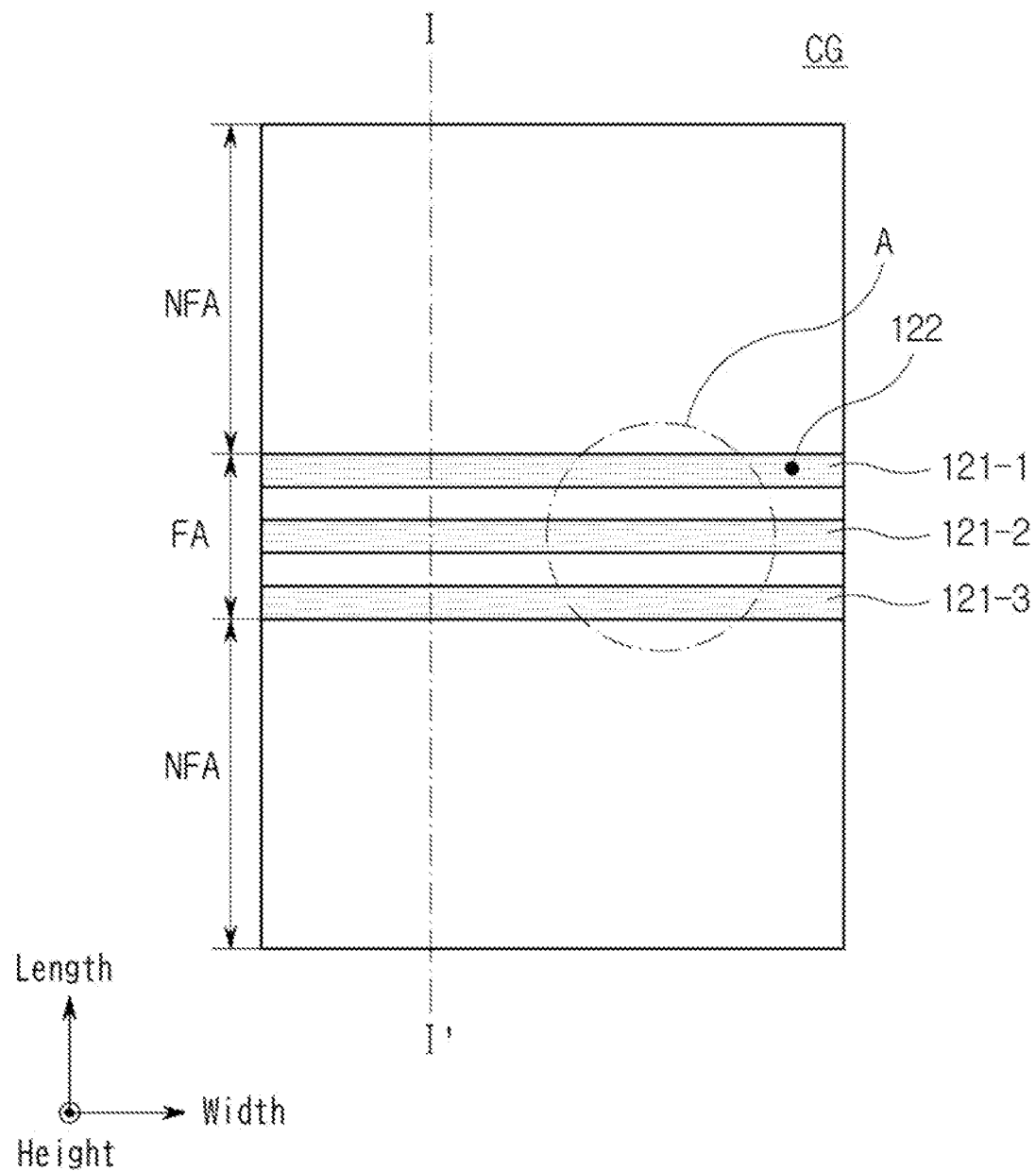

[Fig. 5C]
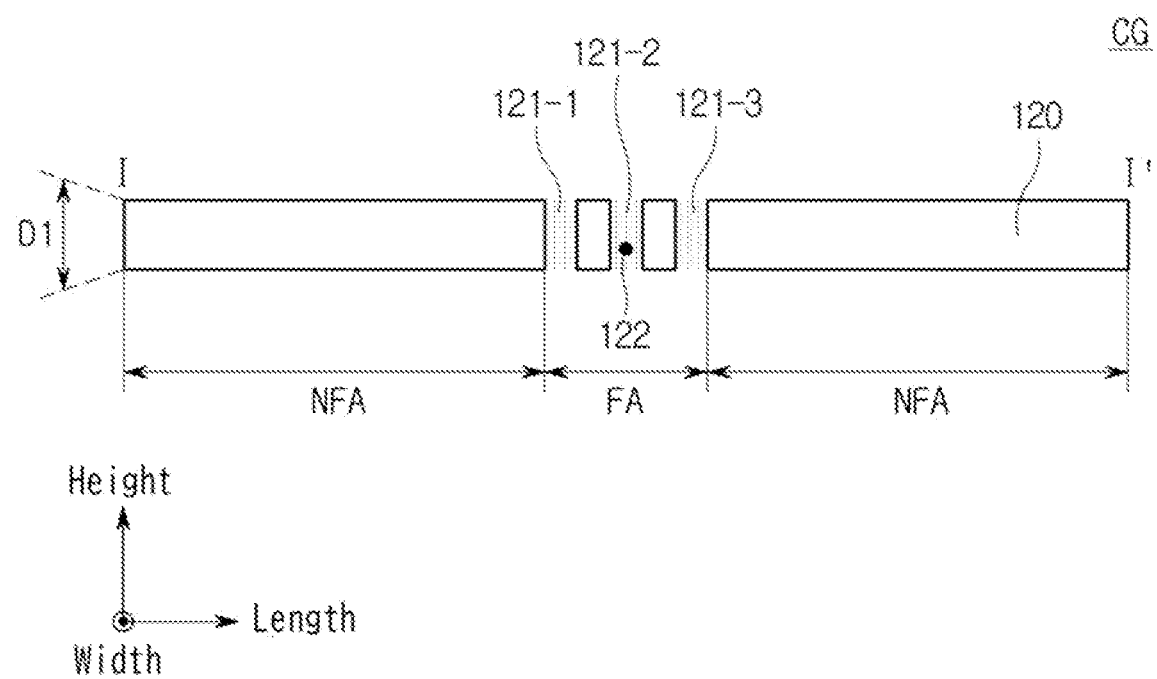

【Fig. 5D】
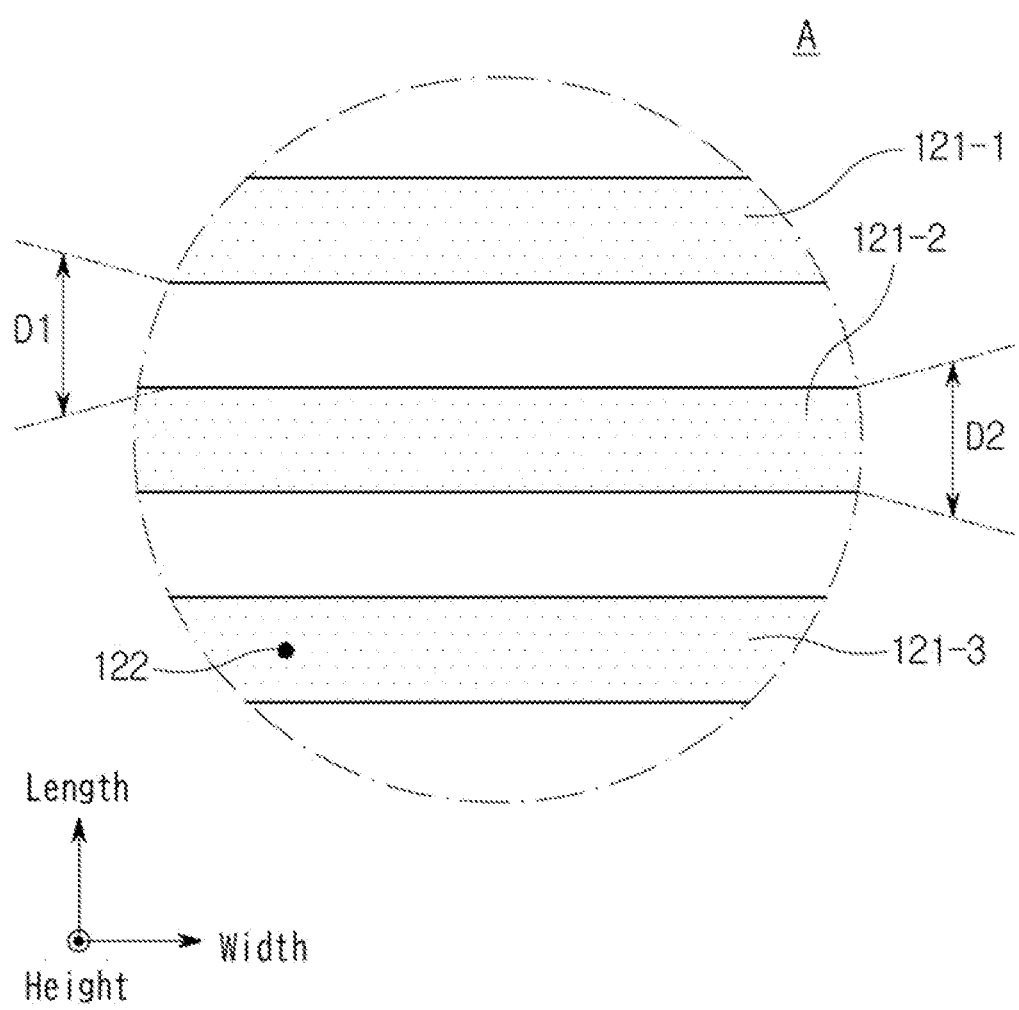

[Fig. 5E]
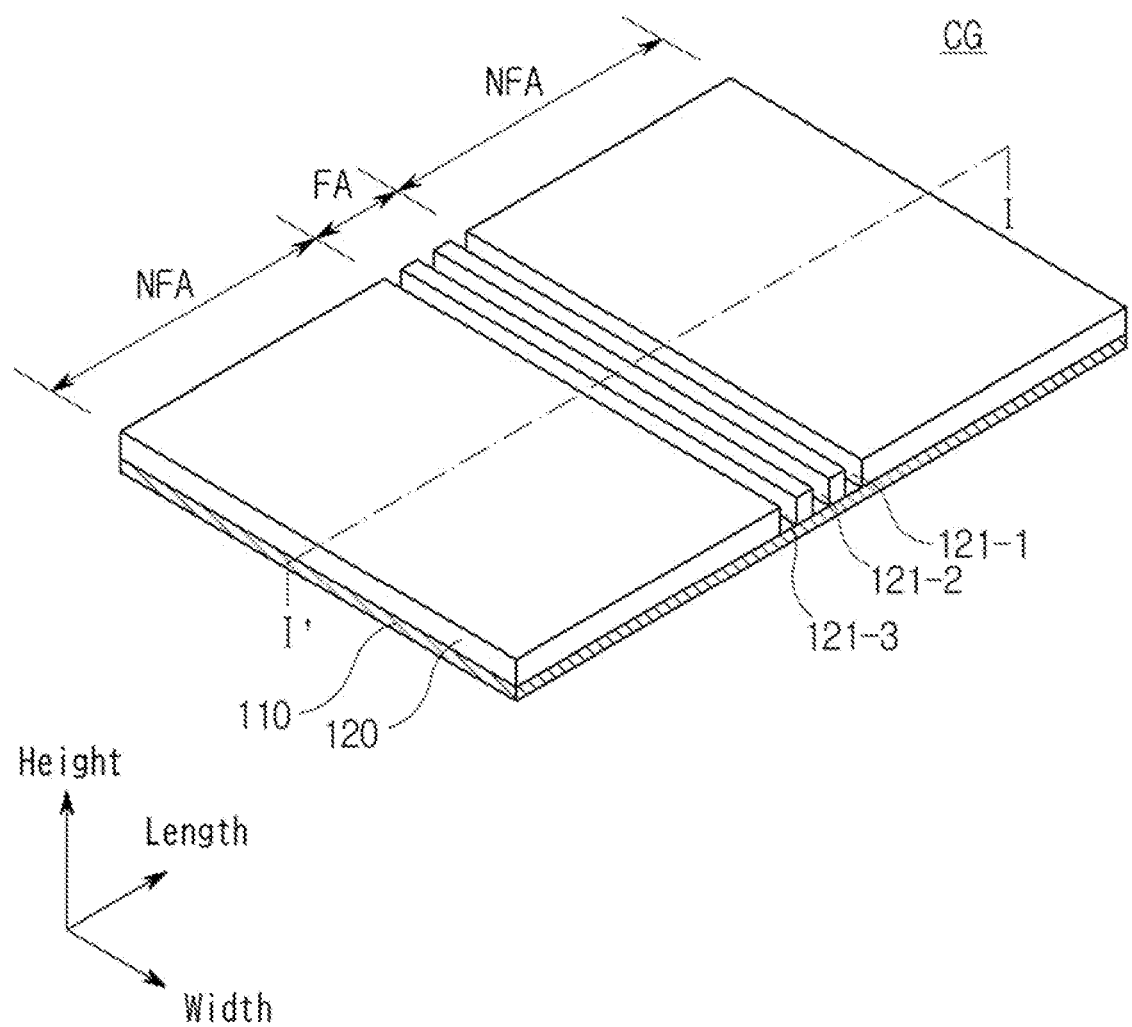

[Fig. 5F]
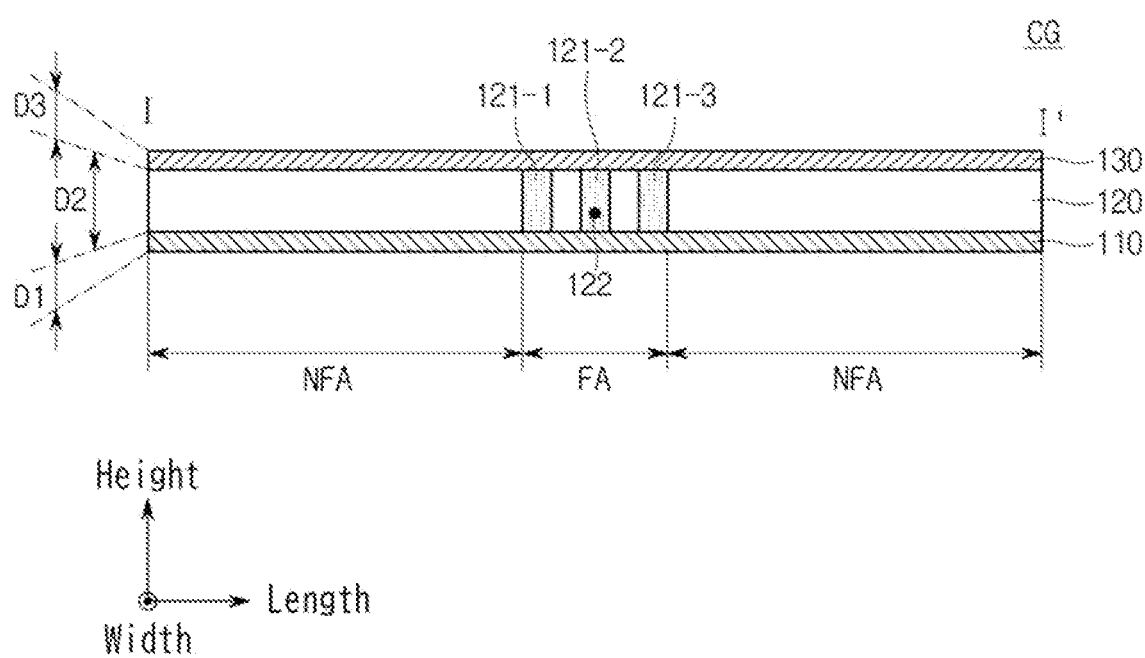

[Fig. 6A]
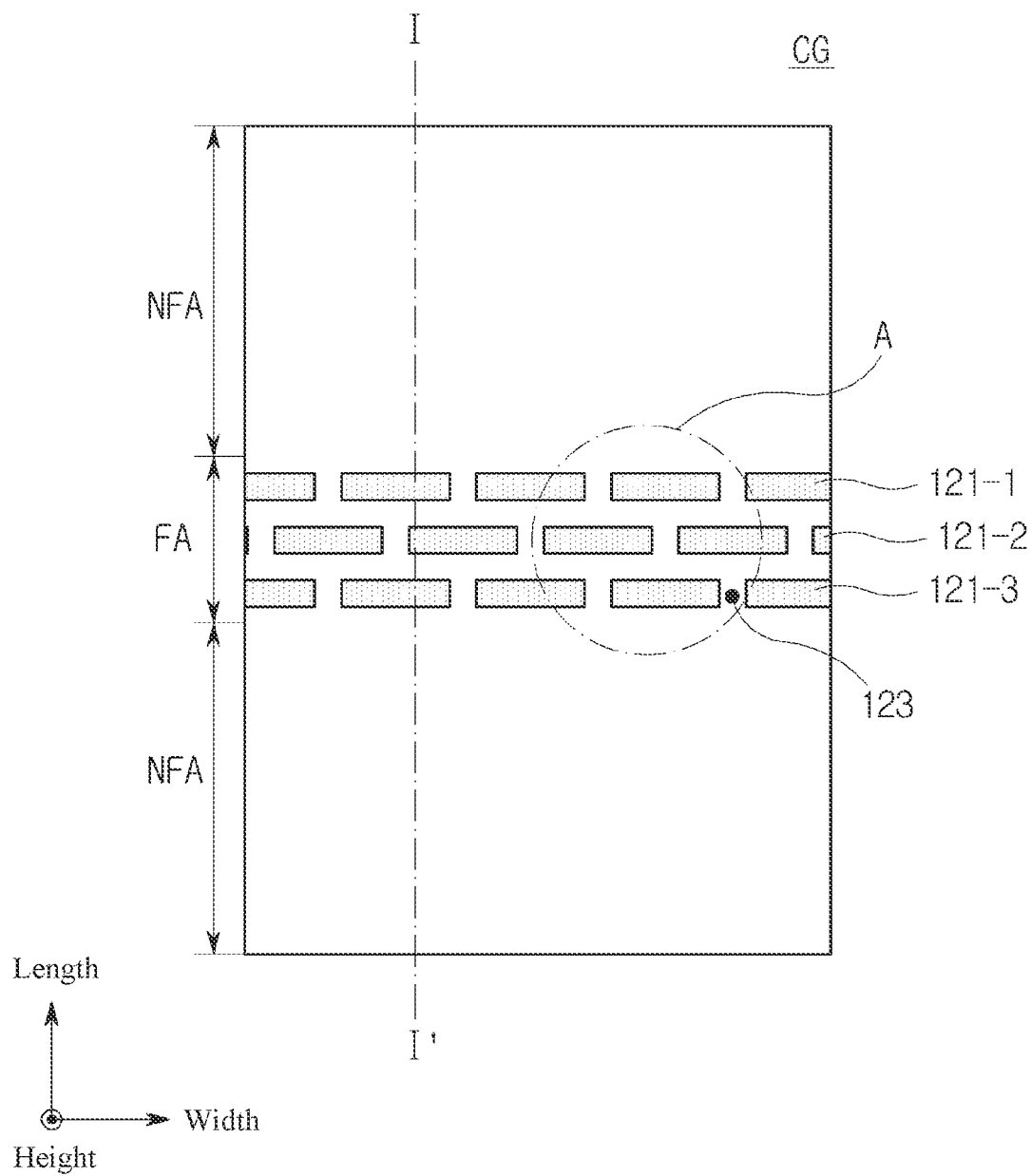

【Fig. 6B】
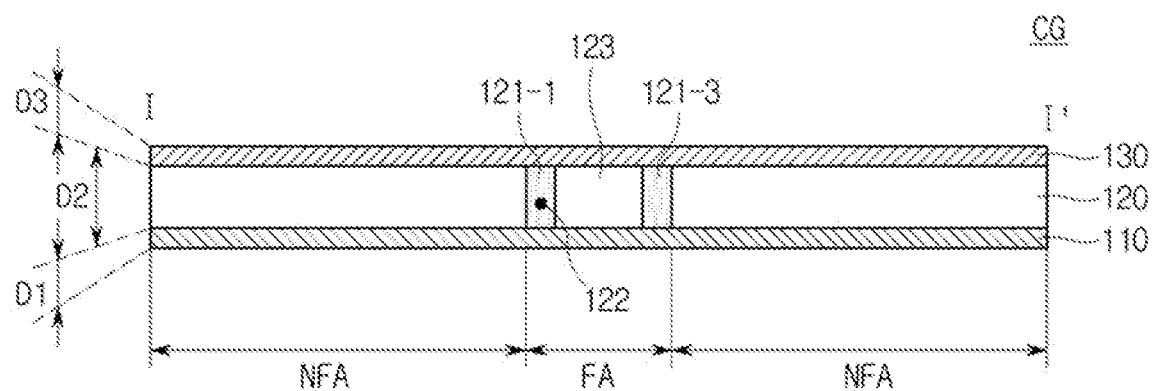

[Fig. 6C]
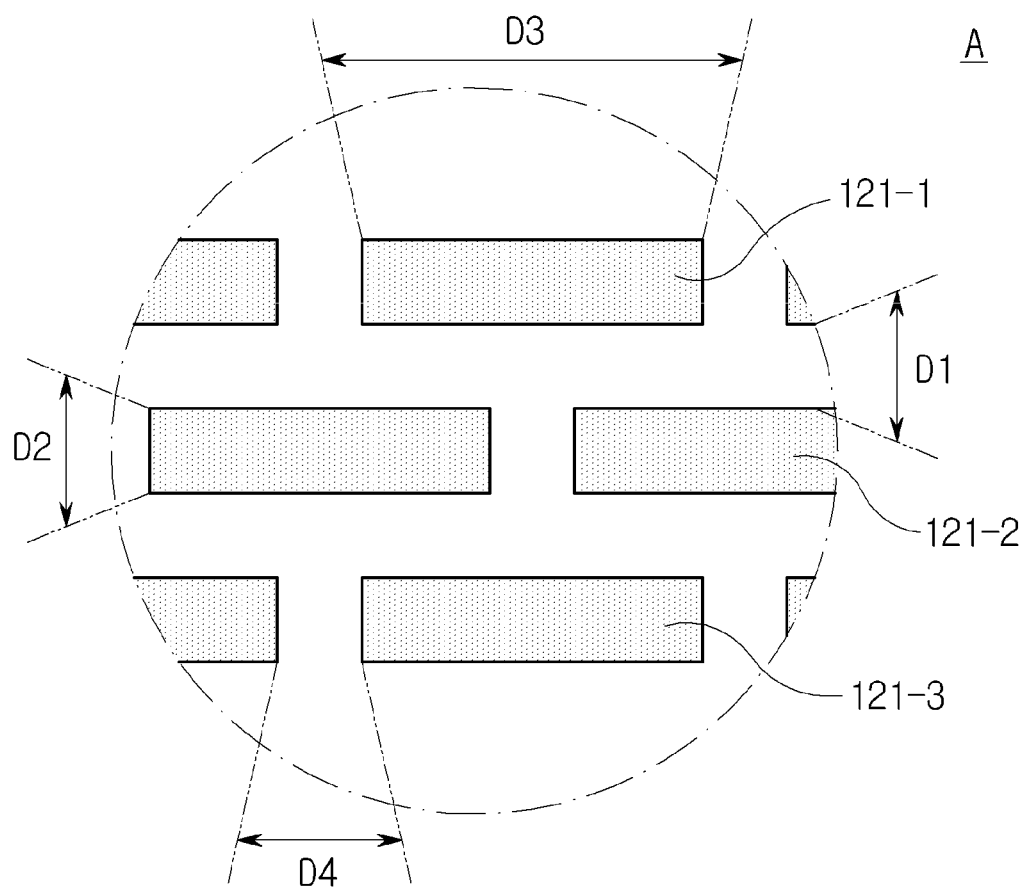

[Fig. 6D]
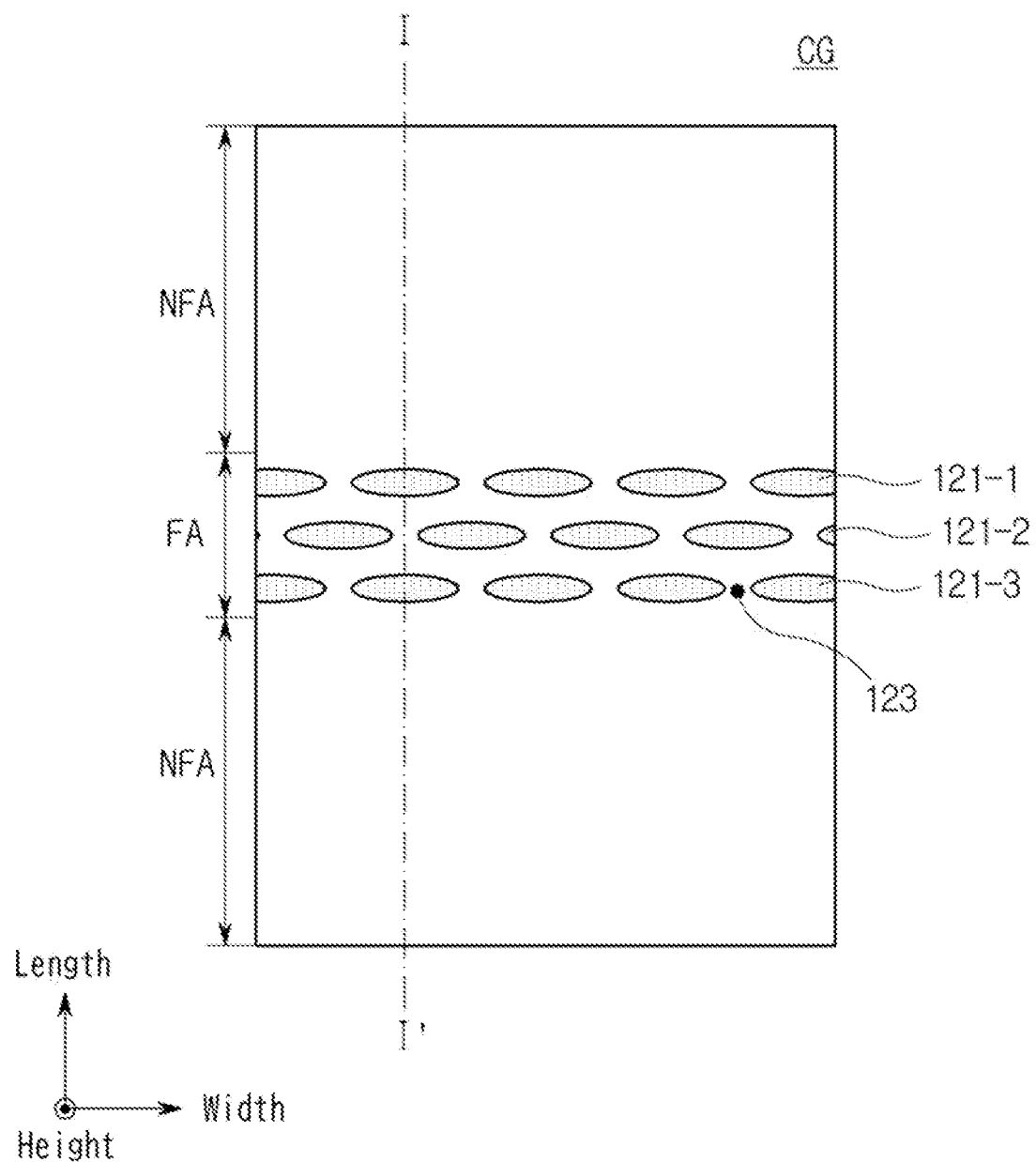

【Fig. 7A】
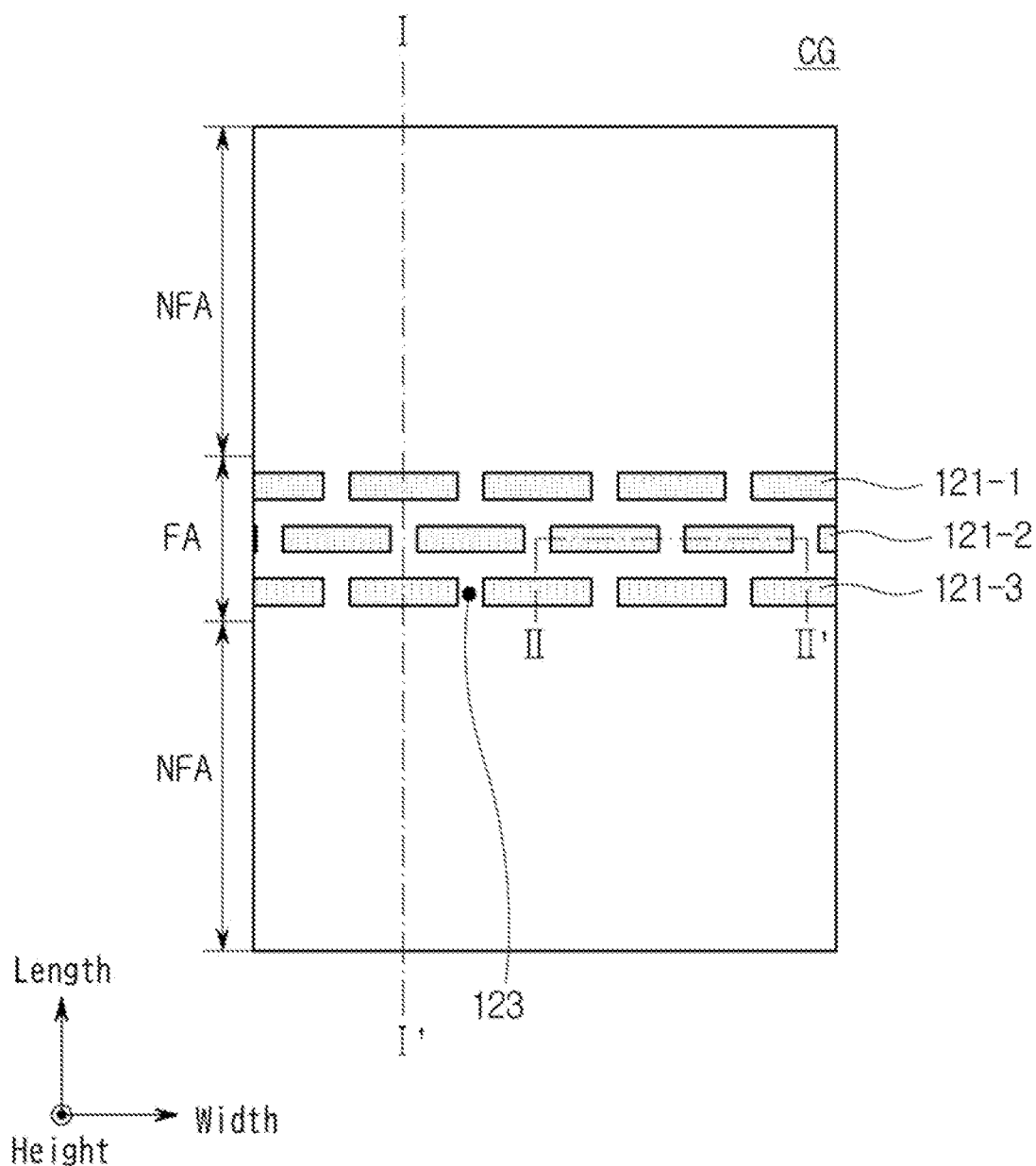

【Fig. 7B】
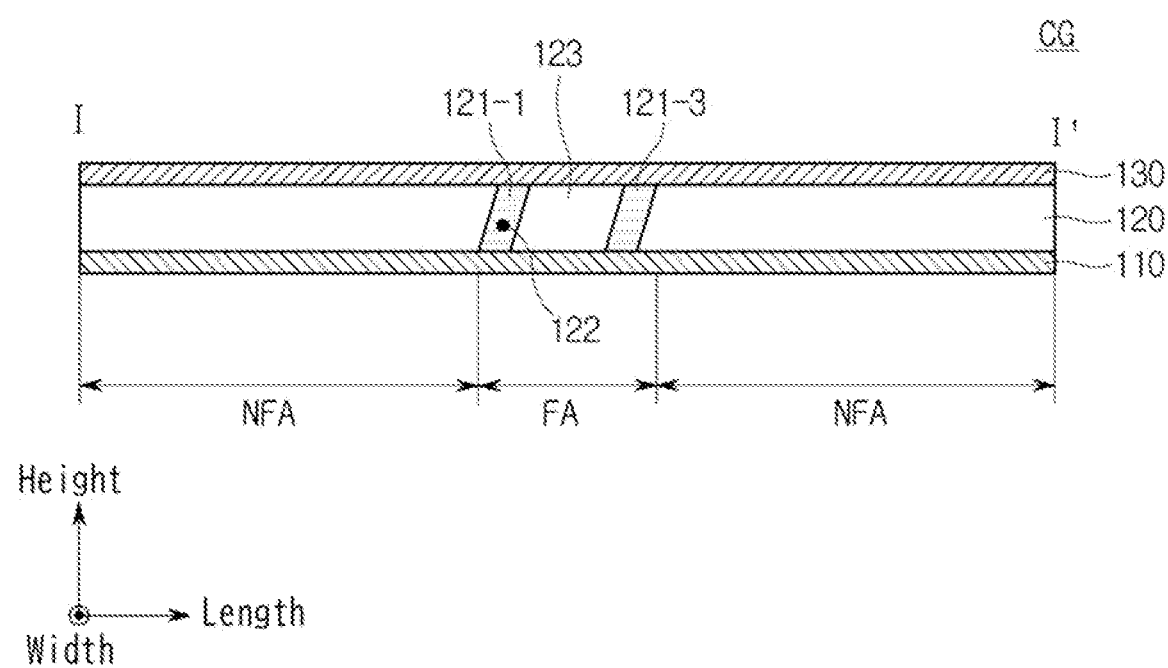

[Fig. 7C]
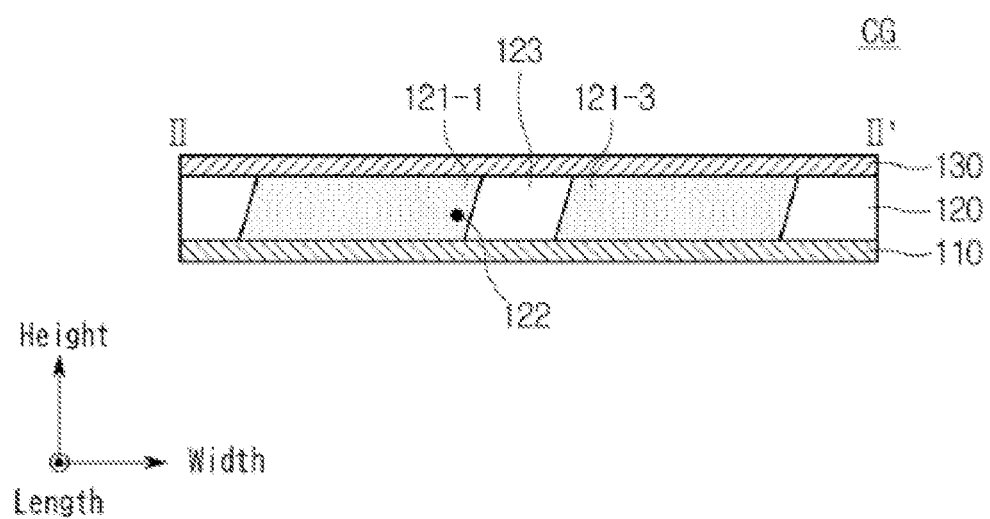

[Fig. 8]
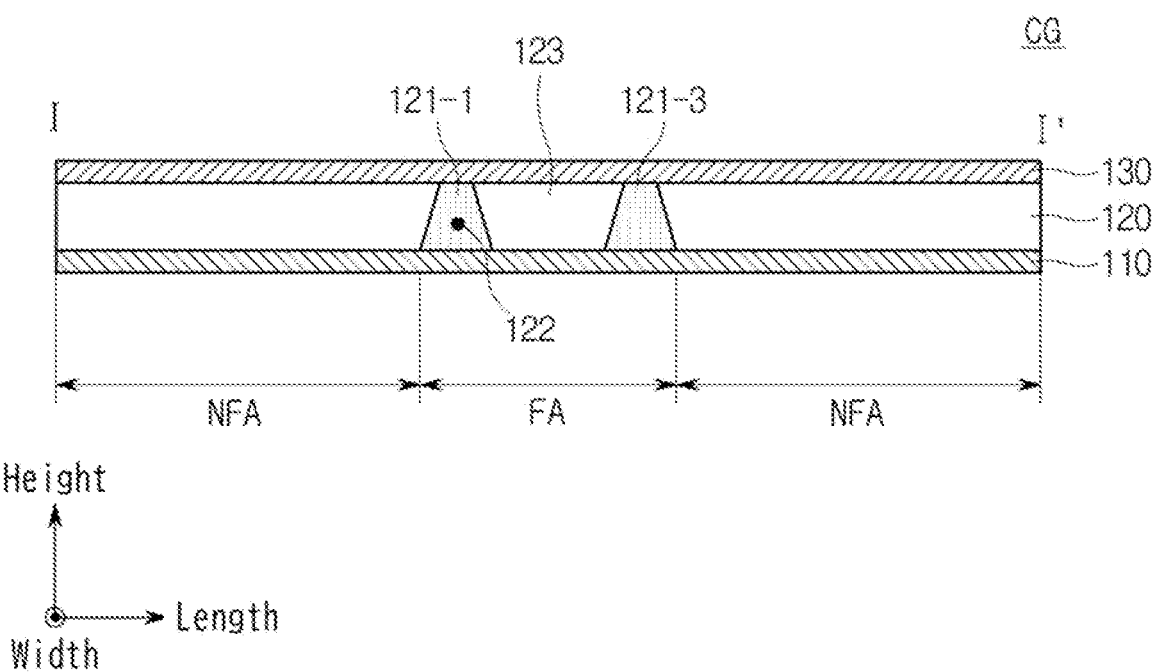

[Fig. 9]
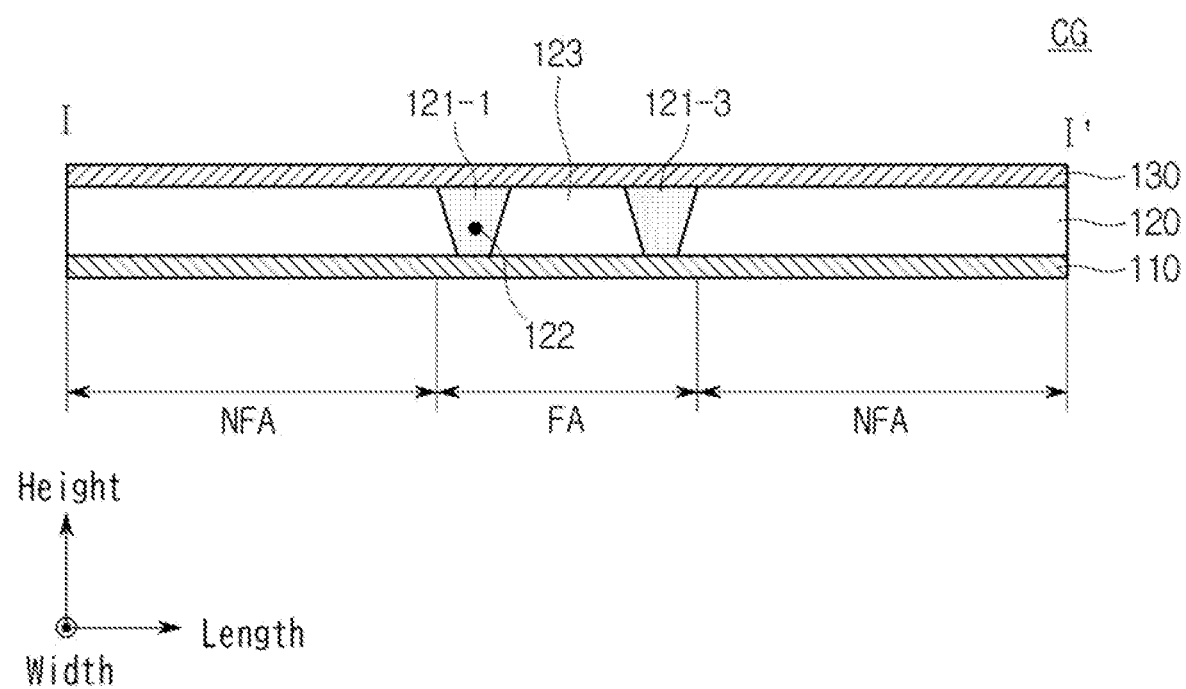

[Fig. 10]
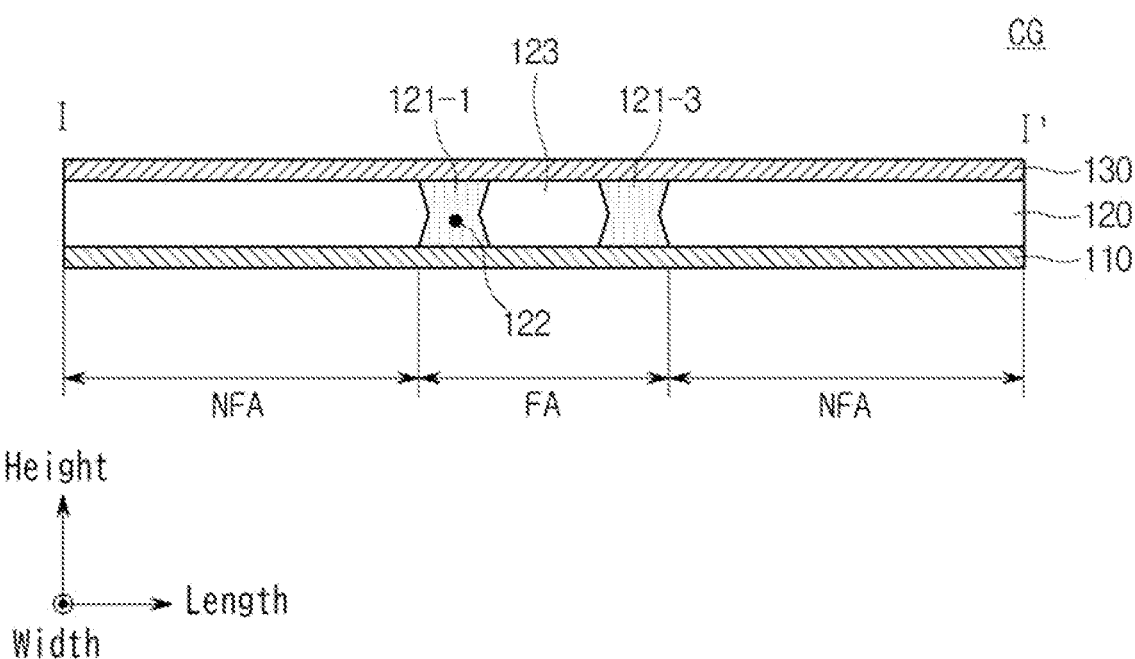

DISPLAY DEVICE HAVING COVER GLASS

CROSS REFERENCE TO RELATED APPLICATION

The present application claims priority to Korean Patent Application No. 10-2020-0120483, filed in the Republic of Korea on Sep. 18, 2020, the entire contents of which are hereby expressly incorporated by reference into the present application.

BACKGROUND OF THE INVENTION

Field of the Invention

The present disclosure relates generally to a display device. More particularly, the present disclosure relates to a display device having a cover glass.

Description of the Related Art

A display device such as a smartphone or TV has recently been miniaturized. Accordingly, a so-called foldable display device in which the display device is fold has appeared, and further, a rollable display device has also appeared.

In such a display device, glass blocking a display panel from the outside is basically placed on the display panel. The glass is referred to as a cover glass. This cover glass is needed to have sufficient thickness to secure rigidity. However, in order to embody the foldable or rollable display device, a thin cover glass is needed, and a cover glass having a thickness of 70 μm or less can be used. Such a cover glass is referred to as an ultra thin glass (UTG) and can secure folding and rolling characteristics of the display device, but may be considered to be weak in rigidity.

SUMMARY OF THE INVENTION

Accordingly, the present disclosure has been made keeping in mind the above issues associated with the related art, and the present disclosure is intended to provide a display device having a cover glass which can secure sufficient rigidity and folding and rolling characteristics by using a thick cover glass having a thickness of 70 μm or more.

In order to achieve the above objectives, according to one aspect of the present disclosure, there is provided a display device including a display panel, and a cover glass located on the display panel, where the cover glass includes a folding area and a non-folding area. The cover glass can include a glass layer having a glass with one or more slits formed in the folding area in a width direction of the glass and formed in a shape passing through the glass in a height direction thereof, and a filler filled in each of the slits.

According to an embodiment of the display device of the present disclosure, the cover glass can be embodied to have the thickness of 70 μm or more in a height direction thereof, thereby realizing a thick glass and improving rigidity.

According to the embodiment of the display device of the present disclosure, the folding characteristic of the display device can be improved due to the flexible filler formed in the slit.

According to the embodiment of the display device of the present disclosure, the out-folding characteristic of the display device can be improved due to the change in the shape of the slit.

According to the embodiment of the display device of the present disclosure, the in-folding characteristic of the display device can be improved due to the change in the shape of the slit.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a view illustrating a display device according to an embodiment of the present disclosure;

FIG. 2, including (a), (b) and (c), illustrates side views of the display device according to the embodiment of the present disclosure;

FIG. 3 is a block diagram of a display panel DP according to the embodiment of the present disclosure;

FIG. 4 is a circuit diagram of one pixel PXL in FIG. 3;

FIGS. 5A, 5B, 5C, 5D, 5E, and 5F are views illustrating a cover glass according to the embodiment of the present disclosure;

FIGS. 6A, 6B, 6C, and 6D illustrate a cover glass according to another embodiment of the present disclosure;

FIGS. 7A, 7B, and 7C are views illustrating a cover glass according to a still another embodiment of the present disclosure;

FIG. 8 is a view illustrating a cover glass according to a still another embodiment of the present disclosure;

FIG. 9 is a view illustrating a cover glass according to a still another embodiment of the present disclosure; and FIG. 10 is a view illustrating a cover glass according to a still another embodiment of the present disclosure.

DETAILED DESCRIPTION OF THE EMBODIMENTS

Hereinafter, embodiments of the present disclosure will be described with reference to the accompanying drawings. In this specification, when a component (or an area, layer, or portion, etc.) is referred to as being "on", "connected to", or "coupled to" another component, it preferably can mean that the component can be directly connected/coupled to other components or that a third component can be disposed therebetween.

Like reference numerals refer to like elements. In addition, in the drawings, the thicknesses, proportions, and dimensions of components are exaggerated for effective description of technical content. Further, "and/or" includes any combination of one or more that the associated configurations can define.

Terms such as first and second, etc. can be used to describe various elements, but the elements are not limited to the terms. The above terms are used only for the purpose of distinguishing one component from another component. For example, without departing from the scope of the present disclosure, the first component can be referred to as the second component.

Similarly, the second component can also be referred to as the first component. A singular expression includes a plural expression unless the context clearly dictates otherwise.

Terms such as "under", "at a lower side", "on", "at an upper side" are used to describe the relationship of the components shown in the drawings. The above terms have relative concepts and are described with reference to directions indicated in the drawings.

Terms such as "comprise" or "have" are intended to designate that a feature, number, step, operation, component, or combination thereof described in the specification is present, and it should be understood that the terms do not preclude the possibility of addition or existence of one or more other features or numbers, steps, operations, components, or combinations thereof. In the present specification, width, length, and height are for distinction therebetween, and depending on an angle viewing an object, the width, length, and height may be used interchangeably and should not be construed as limiting the scope of the claims.

FIG. 1 is a view illustrating a display device according to an embodiment of the present disclosure. All the components of each display device according to all embodiments of the present disclosure are operatively coupled and configured.

Referring to FIG. 1, a display device 10 includes a display panel DP and a cover glass CG disposed on the display device 10.

The display device 10 includes a folding area FA and a non-folding area NFA. The folding area FA indicates a part in which the display device is folded, and the non-folding area NFA indicates a part in which the display device is not folded. Accordingly, when the display device 10 is folded, the folding area FA is bent, but the non-folding area NFA is not bent but is maintained to be a flat surface.

In FIG. 1, the folding area FA is located at the center of the display device 10, and the non-folding area NFA is located at each of the outer sides of the display device 10, but the spirit of the present disclosure includes other forms of the display device 10. For example, the folding area FA can be located at each of the outer sides of the display device 10, and the non-folding area NFA can be located at the center of the display device 10. For another example, the folding area FA can be formed on the entire surface of the display device 10, and thus the display device can be a so-called rollable display device. For further another example, the folding area FA can be formed on the center of the display device 10 and even at parts other than the center, so the display device 10 can embody multi-folding. For example, the folding area FA can be formed at the upper and/or lower part of the display device 10. In this case, the display device 10 can embody edge folding.

The display device 10 includes a display area DA and a non-display area NDA. The display area DA can be an area in which a light emitting diode of the display panel DP is located and an image is displayed, and the non-display area NDA can be an area in which the light emitting diode is not located. Such a non-display area NDA can be an area in which a power supply part, a source driver, or a gate driver for driving the display device is embedded. In addition, the display device 10 can be embodied in the form of a gate in panel in which the gate driver of the display panel DP is embedded in the display panel.

The cover glass CG can have the folding area FA and the non-folding area NFA defined by corresponding to the folding area FA and the non-folding area NFA of the display device 10. For example, the center of the cover glass CG can be defined as a folding area FA which is a foldable area, and each of the outer sides of the cover glass CG can be defined as a non-folding area NFA which is a non-foldable area.

The display panel DP can have the display area DA and the non-display area NDA defined by corresponding to the display area DA and the non-display area NDA of the display device 10.

The cover glass CG described above can include a lower coating layer, a glass layer which is the upper layer of the lower coating layer, and an upper coating layer which is the upper layer of the glass layer, which will be described later.

Meanwhile, referring to the accompanying drawings, width, length, and height directions are shown together. This is for convenience of description and does not limit the scope of the present disclosure. For example, the directions are intended to indicate width, length, and height when viewed from a direction as illustrated in FIG. 1, and when viewed from another direction, the width, length, and height can be defined differently. Such definitions of the width, length, and height have been consistently expressed in the present specification FIG. 2 illustrates side views of the display device.

Referring to (a) of FIG. 2, the display device 10 includes the display panel DP and the cover glass CG located on the display panel DP. For the cover glass CG in a length direction thereof, some areas are defined as non-folding areas NFA, and an area is defined as a folding area FA. Specifically, the center of the display device 10 is defined as a folding area FA, and each of the opposite sides of the folding area FA in the length direction is defined as a non-folding area NFA. Accordingly, when the display device 10 is folded, the folding area FA can be bent such that the non-folding areas NFA are in contact with each other.

Referring to (b) of FIG. 2, the display device 10 can be folded in an out-folding way/method. The out-folding method can indicate a method in which the display panel is exposed to the outside when the display device 10 is folded. As illustrated in (b) of FIG. 2, since the cover glass CG is folded to be located at the inside of the display device 10, the non-folding areas NFA are in contact with each other relative to the folding area FA of the cover glass CG and the display panel DP is exposed to the outside.

Referring to (c) of FIG. 2, the display device 10 can be folded in an in-folding way/method. The in-folding method can indicate a method in which the display panel is hidden inside the cover glass when the display device 10 is folded. As illustrated in (c) of FIG. 2, since the cover glass CG is folded to be located at the outside of the display device 10, the non-folding areas NFA are in contact with each other relative to the folding area FA of the display panel DP and the display panel DP is hidden inside the cover glass.

FIG. 3 is a block diagram of an example of the display panel DP according to the embodiment of the present disclosure. FIG. 4 is a circuit diagram of one pixel PXL in FIG. 3.

Referring to FIGS. 3 and 4, the display device 10 according to the embodiment of the present disclosure includes pixels PXL provided on the display area DA, a gate driver GDV (20) and a data driver DDV configured to drive the pixels PXL, and a timing controller TCN (10) configured to control the driving of the gate driver GDV and the data driver DDV.

Each pixel PXL is provided on the display area DA and includes a wiring part composed of a gate line GL, a data line DL, and a drive voltage line DVL; the thin film transistors connected to the wiring part; an organic light emitting diode EL connected to the thin film transistors; and a capacitor Cst.

The gate line GL extends in a first direction. The data line DL extends in a second direction intersecting the gate line GL. The drive voltage line DVL extends in substantially the same direction as the direction of the data line DL. The gate line GL transmits a gate signal to the thin film transistor, the data line DL transmits a data signal to the thin film transistor, and the drive voltage line DVL supplies a drive voltage to the thin film transistor.

The thin film transistor can include a driving thin film transistor TR2 configured to control the organic light emitting diode EL and a switching thin film transistor TR1 configured to switch the driving thin film transistor TR2. In the embodiment of the present disclosure, one pixel PXL is described to include two thin film transistors TR1 and TR2, but is not limited thereto. Accordingly, one pixel PXL can be provided with one thin film transistor and one capacitor, or can be provided with at least three thin film transistors and at least two capacitors.

In the switching thin film transistor TR1, a gate electrode is connected to the gate line GL, and a source electrode is connected to the data line DL. A drain electrode of the switching thin film transistor is connected to the gate electrode of the driving thin film transistor TR2. According to the gate signal applied to the gate line GL, the switching thin film transistor TR1 transmits the data signal applied to the data line DL to the driving thin film transistor TR2.

In the driving thin film transistor TR2, a gate electrode is connected to the drain electrode of the switching thin film transistor, a source electrode is connected to the drive voltage line DVL, and a drain electrode is connected to the organic light emitting diode EL.

The organic light emitting diode EL includes a light emitting layer, and a first electrode and a second electrode facing each other with the light emitting layer placed therebetween. The first electrode is connected with the drain electrode of the driving thin film transistor TR2. A common voltage is applied to the second electrode, and the light emitting layer (EML) emits or does not emit light according to an output signal of the driving thin film transistor TR2 so as to display an image. Here, the light emitted from the light emitting layer can be white light or color light.

The capacitor Cst can connect the gate electrode and source electrode of the driving thin film transistor TR2 to each other therebetween, and charges and maintains the data signal input to the gate electrode of the driving thin film transistor TR2.

The timing controller TCN receives multiple image signals RGB and multiple control signals CS from the outside of the display device. The timing controller TCN converts the data format of the image signals RGB to match an interface specification with the data driver DDV, and provides the converted image signals (R'G'B') to the data driver DDV. In addition, the timing controller TCN generates a data control signal D-CS (for example, an output start signal and a horizontal start signal, etc.) and a gate control signal G-CS (for example, a vertical start signal, a vertical clock signal, and a vertical clock bar signal) on the basis of the multiple control signals CS. The data control signal D-CS is provided to the data driver DDV and the gate control signal G-CS is provided to the gate driver GDV.

The gate driver GDV sequentially outputs the gate signal in response to the gate control signal G-CS provided from the timing controller TCN. Accordingly, multiple pixels PXL can be sequentially scanned row by row due to the gate signal.

In response to the data control signal D-CS provided from the timing controller TCN, the data driver DDV converts the image signals R'G'B' into data signals and outputs the data signals. The output data signals are applied to the pixels PXL.

Accordingly, each pixel PXL is turned on due to the gate signal, and the turned on pixel PXL receives the associated data voltage from the data driver DDV and displays an image of a desired gradation FIGS. 5A, 5B, 5C, 5D, 5E, and 5F are views illustrating the cover glass according to the embodiment of the present disclosure.

Referring to FIG. 5A, a perspective view of the cover glass CG according to the embodiment of the present disclosure is illustrated. Referring to FIG. 5B, a top plan view of the cover glass CG of FIG. 5A according to the embodiment of the present disclosure is illustrated. Referring to FIG. 5C, a sectional view of the cover glass CG taken along line I-I' of FIG. 5A is illustrated. Referring to FIG. 5D, an enlarged view of an A part of the cover glass of FIG. 5B according to the embodiment of the present disclosure is illustrated. Referring to FIG. 5E, a perspective view of the cover glass according to the embodiment of the present disclosure is illustrated. Referring to FIG. 5F, a sectional view of the cover glass taken along line I-I' of FIG. 5E according to the embodiment of the present disclosure is illustrated.

As illustrated in FIGS. 5A and 5B, the cover glass CG includes the glass layer 120. In FIG. 5A, the illustration of a filler 122 filled in each of the slits 121-1 to 121-3 is omitted to illustrate the glass layer 120 in detail, and the filler 122 is illustrated in detail in FIGS. 5B, 5C, and 5D.

The glass layer 120 is a layer including glass, wherein the glass includes one or more slits 121-1 to 121-3 formed in the folding area FA in a width direction of the glass. Three slits illustrated in the drawings are exemplary, and more or fewer slits can be formed. Such a slit has the filler located therein and is a structure configured to improve the folding characteristics of the cover glass CG. Accordingly, the slit can be formed only in the folding area FA, but may not be formed in the non-folding area NFA which is an area that excludes the folding area. As described above, in FIG. 5A, a total of three slits is illustrated, but the number of the slits is exemplary. For example, in a case in which one slit can secure the folding characteristic, the number of the slits can be one.

As illustrated in FIGS. 5A and 5B, the glass layer 120 has glass formed on an entire surface thereof. Such a glass can have thickness of 70 μm or more in the height direction of the glass. For example, according to a prior art, a glass suitable for folding is an ultra thin glass (UTG) and cannot have the thickness of 70 μm or more for the folding characteristic. Accordingly, the glass of the prior art can improve the folding characteristic due to the adoption of a thin glass but has low rigidity. However, although the display device according to the present disclosure is provided with the cover glass using a thick glass having the thickness of 70 μm or more, the display device can secure improved folding characteristic and rigidity.

Specifically, each of one or more slits 121-1 to 121-3 can be formed in the width direction of the glass, and can have a shape passing through the glass in the height direction thereof. The filler 122 can be formed in space of each of the slits 121-1 to 121-3. The filler 122 is formed of a flexible material and can improve a folding characteristic thereof when folding the display device 10. Such a filler 122 can be formed in the inner space of each of the slits 121-1 to 121-3 in a jetting or pneumatic method.

The filler 122 described above can be a material which has a transmittance of 80% or more, a reflectance of 20% or less, a refractive index of 1.45 to 1.55, and an elongation rate of 30% or more. For example, the material of the filler 122 can be a material based on silicone, acrylic, an epoxy, or urethane.

Referring to FIG. 5C, a sectional view taken along line I-I' of the cover glass illustrated in FIG. 5A is illustrated.

Referring to FIG. 5C, the height D1 of the glass layer 120 can be 70 μm or more due to the adoption of a thick glass, and the filler 122 of the inside of each of the slits 121-1 to 121-3 can also have the same height of 70 μm or more.

In FIG. 5D, the enlarged view of the A part of the cover glass CG illustrated in FIG. 5B is illustrated. A distance D1 between the slits 121-1 to 121-3 according to the present disclosure can be 10 mm or less, and preferably can be 0.50 mm. In addition, a width D2 of each of the slits in the length direction can be 10 mm or less, and preferably, can be 0.50 mm. The inventors of the display device of the present disclosure confirmed that the highest folding characteristic and the highest rigidity can be secured when such dimensions are adopted.

Referring to FIG. 5E, a perspective view of the cover glass according to the embodiment of the present disclosure is illustrated, and referring to FIG. 5F, a sectional view of the cover glass taken along line I-I' of the cover glass of FIG. 5E according to the embodiment of the present disclosure is illustrated.

As illustrated in FIG. 5E, the cover glass CG includes the lower coating layer 110 and the glass layer 120 disposed on the lower coating layer 110. In FIG. 5E, the illustration of the upper coating layer 130 which is the upper layer of the glass layer 120 is omitted to illustrate the glass layer 120 in detail, and the upper coating layer 130 is illustrated in detail in FIG. 5F.

The lower coating layer 110 is used to improve visibility of image light emitted from the display panel DP disposed under the lower coating layer 110. Accordingly, the lower coating layer 110 can be formed of a transparent material. In addition, the lower coating layer 110 is used to flatten the surface of the display device 10. Accordingly, the lower coating layer 110 can be formed on the entire surface of the display panel. In addition, the lower coating layer 110 is used to improve the folding characteristic of the display device 10. Accordingly, the lower coating layer 110 can be formed of a flexible material. In addition, as described later, the lower coating layer 110 can be formed in each of one or more slits having the shape of an opening formed in the glass layer 120. For example, when the material of the lower coating layer 110 is applied on the display panel DP and the glass layer including a glass having the slits formed therein is placed on the lower coating layer 110, the material of the lower coating layer 110 can be introduced into the space of each of the slits in a squeezing, jetting, or pneumatic method. Accordingly, the filler formed in the slit can be formed of the same material as the material of the lower coating layer 110. Such a lower coating layer 110 can be formed of resin. Meanwhile, the filler formed in the inner space of each of the slits 121-1 to 121-3 can be formed of a material different from the material of the lower coating layer 110.

Meanwhile, the lower coating layer 110 can include an adhesive component. When the lower coating layer 110 includes the adhesive component, the lower coating layer 110 can adhere to the display panel which is the lower layer of the lower coating layer 110. Accordingly, a separate adhesive layer which is a layer for bonding the display panel to the glass layer 120 can be omitted. The lower coating layer 110 including such an adhesive component can be formed on the entire surface of the display panel.

As described later, the lower coating layer 110 can be formed inside each of the slits 121-1 to 121-3 which has a shape of an opening formed in the glass layer 120. For example, when the material of the lower coating layer 110 is applied on the display panel DP and the glass layer 120 including the glass having the slits 121-1 to 121-3 formed therein is placed on the lower coating layer 110, the material of the lower coating layer 110 can be introduced into the inner space of each of the slits 121-1 to 121-3 in a squeezing, jetting, or pneumatic method. Meanwhile, the filler formed in the inner space of each of the slits 121-1 to 121-3 can be formed of a material different from the material of the lower coating layer 110.

The glass layer 120 as the upper layer of the lower coating layer 110 includes glass. In addition, the glass includes one or more slits 121-1 to 121-3 formed in the folding area FA in the width direction. Three slits illustrated in the drawings are exemplary, and more or fewer slits can be formed. Such a slit has the filler located therein and is a structure configured to improve the folding characteristics of the cover glass CG. Accordingly, the slit can be formed only in the folding area FA, but may not be formed in the non-folding area NFA which is an area that excludes the folding area As illustrated in FIGS. 5E and 5F, the glass layer 120 has glass formed on the entire surface thereof. Such a glass can have the thickness of 70 μm or more in the height direction of the glass. For example, according to the prior art, a glass suitable for folding is an ultra thin glass (UTG) and cannot have the thickness of 70 μm or more for the folding characteristic. Accordingly, the glass of the prior art can improve the folding characteristic due to the adoption of a thin glass but has low rigidity. However, although the display device according to the present disclosure is provided with the cover glass using a thick glass having the thickness of 70 μm or more, the display device can secure improved folding characteristic and rigidity.

Specifically, each of the slits 121-1 to 121-3 can be formed in the width direction of the glass and can have a shape passing through the glass in the height direction thereof. The lower coating layer 110 which is the lower layer of the glass layer 120 can be formed of flexible resin, and when the glass layer 120 which is the upper layer of the lower coating layer 110 and embodied as glass including the slits is placed on the lower coating layer 110, resin which is the material of the lower coating layer 110 can be introduced into the space of each of the slits 121-1 to 121-3 in a squeezing, jetting, or pneumatic method. Accordingly, the filler 122 can be formed in the space of each of the slits 121-1 to 121-3. Meanwhile, the filler formed in the inner space of each of the slits 121-1 to 121-3 can be formed of a material different from the material of the lower coating layer 110. The filler 122 is formed of a flexible material like the material of the lower coating layer 110, and thus can improve the folding characteristic when folding the display device 10.

The upper coating layer 130 is a layer placed on the glass layer 120 and can be formed of a soft or strong material. Such an upper coating layer 130 is coated on the front surface of the display panel DP and can function to improve hardness of the cover glass.

The filler 122 described above can be a material which has a transmittance of 80% or more, a reflectance of 20% or less, a refractive index of 1.45 to 1.55, and an elongation rate of 30% or more. For example, the material of the filler 122 can be a material based on silicone, acrylic, an epoxy, or urethane.

The lower coating layer 110 described above can be a material which has a transmittance of 80% or more, a reflectance of 20% or less, a refractive index of 1.45 to 1.55, and an elongation rate of 30% or more. For example, the material of the lower coating layer 110 can be a material based on silicone, acrylic, an epoxy, or urethane.

The upper coating layer 130 described above can be a material which has a transmittance of 80% or more, a reflectance of 20% or less, a refractive index of 1.45 to 1.55, and an elongation rate of 30% or more. For example, the material of the upper coating layer 130 can be a material based on silicone, acrylic, an epoxy, or urethane.

Referring to FIG. 5F, the height D1 of the lower coating layer 110 described above can be 100 μm or less and preferably, can be 50 μm or less. The height D2 of the glass layer 120 can be 70 μm or more due to the adoption of a thick glass, and the height D3 of the upper coating layer can be 100 μm or less and preferably, can be 30 μm or less. The inventors of the display device of the present disclosure confirmed that the highest folding characteristic and the highest rigidity can be secured when structures having such heights are adopted.

Meanwhile, an upper film can be placed on an upper layer of the upper coating layer 130 described above. Such an upper film can be placed on the upper layer of the upper coating layer 130 so as to supplement visibility or improve rigidity.

In addition, the upper coating layer 130 described above can be replaced with the upper film. Such an upper film can be intended to supplement visibility or improve rigidity.

The upper film described above can have thickness of 0.15 mm or less and can be a film based on a PET (polyethylene terephthalate) or PI (polyimide). Such an upper film can be attached on the glass layer 120 or the upper coating layer 130 in a roller lamination method.

FIGS. 6A, 6B, 6C, and 6D illustrate the cover glass according to another embodiment of the present disclosure.

Referring to FIG. 6A, a top plan view of the cover glass CG according to the embodiment of the present disclosure is illustrated; referring to FIG. 6B, a sectional view of the cover glass CG taken along line I-I' of FIG. 6A according to the embodiment of the present disclosure is illustrated; and referring to FIG. 6C, an enlarged view of the A part of the cover glass CG of FIG. 6A according to the another embodiment of the present disclosure is illustrated.

Referring to FIG. 6A, the cover glass CG includes the lower coating layer 110 and the glass layer 120 located at the upper side of the lower coating layer 110. In FIG. 6A, the illustration of the upper coating layer 130 which is the upper layer of the glass layer 120 is omitted to illustrate the glass layer 120 in detail, and the upper coating layer 130 is illustrated in detail in FIG. 6B.

The glass layer 120 as the upper layer of the lower coating layer 110 includes glass. In addition, the glass includes one or more slits 121-1 to 121-3 formed in the folding area FA in the width direction of the glass, and each of the slits 121-1 to 121-3 includes a bridge 123 by which the slit is discontinued in the width direction of the glass. Each of the slits 121-1 to 121-3 includes at least one bridge 123. Accordingly, each of the slits 121-1 to 121-3 can have a dotted line shape. More specifically, in the embodiment referring to FIGS. 5A to 5D, each of the slits 121-1 to 121-3 has a continuous shape in the width direction, but in the another embodiment of the present disclosure, each of the slits 121-1 to 121-3 having a shape discontinued by at least one bridge 123 is proposed.

Such slits 121-1 to 121-3 can have a shape passing through the glass in the height direction thereof, and the bridge 123 can be the glass instead of passing through the glass. The lower coating layer 110 which is the lower layer of the glass layer can be formed of a flexible material, and the upper layer of the lower coating layer 110 is the glass layer 120 embodied as glass including the slits. Accordingly, when the glass is placed on the lower coating layer 110, resin which is the material of the lower coating layer 110 can be introduced into the space of each of the slits 121-1 to 121-3 in a squeezing, jetting, pneumatic method. Accordingly, the filler 122 can be formed in the space of each of the slits 121-1 to 121-3. Meanwhile, the filler formed in the inner space of each of the slits 121-1 to 121-3 can be formed of a material different from the material of the lower coating layer 110.

Accordingly, referring to FIG. 6B illustrating the section of the cover glass CG taken in a length direction I-I' thereof, glass can be located in the non-folding area NFA, and the slits, the filler 122 filled in the slits 121-1 to 121-3, and the bridge 123 located between the slit 121-1 and the slit 121-3 can be located in the folding area FA. Referring to FIG. 6B, the height D1 of the lower coating layer 110 described above can be 100 μm or less, the height D2 of the glass layer 120 can be 70 μm or more due to the adoption of a thick glass, and the height D3 of the upper coating layer can be 100 μm or less. The inventors of the display device of the present disclosure confirmed that the highest folding characteristic and the highest rigidity can be secured when structures having such heights are adopted.

Referring to the enlarged view of the A part of the cover glass CG of FIG. 6A illustrated in FIG. 6C, a length distance D1 between the slits 121-1 to 121-3 according to the present disclosure can be 10 mm or less and preferably, can be 0.5 mm. The length width D2 of each of the slits can be 10 mm or less and preferably, can be 0.3 mm. In addition, the width D4 of the bridge can be 1.0 mm or less and preferably, can be 0.5 mm or less. A width distance D3 between a bridge and a bridge can be 15 mm or less. The inventors of the display device of the present disclosure confirmed that the highest folding characteristic and the highest rigidity can be secured when such dimensions are adopted.

Referring to FIG. 6D, the top plan view of the cover glass CG according to the embodiment of the present disclosure is illustrated. Referring to FIG. 6D, the cover glass CG includes the lower coating layer 110 and the glass layer 120 located on the lower coating layer 110. In FIG. 6D, the illustration of the upper coating layer 130 which is the upper layer of the glass layer 120 is omitted to illustrate the glass layer 120 in detail. In addition, it will be understood that a cover glass CG including only the glass layer 120 which is the cover glass CG excluding the upper coating layer 130 and the lower coating layer 110 can also belong to the scope of the present disclosure.

The glass layer 120 as an upper layer of the lower coating layer 110 includes glass. In addition, the glass includes one or more slits 121-1 to 121-3 formed in the folding area FA in the width direction, and each of the slits 121-1 to 121-3 includes the bridge 123 by which the slit is discontinued in the width direction. Each of the slits 121-1 to 121-3 includes at least one bridge 123. According to the embodiment, each of the slits 121-1 to 121-3 can have a streamlined shape instead of the shape of a dotted line. The streamlined shape refers to a shape in which the width and length sides of the slits are shaped in curved shapes.

According to the embodiment, by adopting the slits 121-1 to 121-3 configured in a streamlined shape, it is possible to minimize a Moire phenomenon, which is an obstacle to a viewer's view. The pixels of the display panel located under the cover glass CG are configured in the form of an array having horizontal rows and vertical columns and the Moire phenomenon is a failure phenomenon which can occur when the cover glass CG is also configured in the form of an array having horizontal rows and vertical columns. As in the embodiment, the slits of the cover glass CG which is the upper layer of the display panel has a shape different from the shape of the pixels of the display panel which is the lower layer of the cover glass such that such a Moire phenomenon can be minimized.

Each of the slits 121-1 to 121-3 can have a shape passing through the glass in the height direction thereof, and the bridge 123 can be the glass instead of passing through the glass. The lower coating layer 110 which is the lower layer of the glass layer can be formed of a flexible material and the upper layer of the lower coating layer 110 is the glass layer 120 embodied as glass including the slits. Accordingly, when the glass is placed on the lower coating layer 110, resin which is the material of the lower coating layer 110 can be introduced into the space of each of the slits 121-1 to 121-3 in a squeezing, jetting, or pneumatic method. Accordingly, the filler 122 can be formed in the space of each of the slits 121-1 to 121-3. Meanwhile, the filler formed in the inner space of each of the slits 121-1 to 121-3 can be formed of a material different from the material of the lower coating layer 110.

FIGS. 7A, 7B, and 7C are views illustrating the cover glass according to a still another embodiment of the present disclosure Referring to FIG. 7A, a top plan view of the cover glass CG according to the embodiment of the present disclosure is illustrated; referring to FIG. 7B, a sectional view of the cover glass CG taken along line I-I' of FIG. 7A according to the embodiment of the present disclosure is illustrated; referring to FIG. 7C, a sectional view of the cover glass CG taken along line II-II' of FIG. 7A according to the embodiment of the present disclosure is illustrated.

The glass layer 120 as an upper layer of the lower coating layer 110 includes glass. In addition, the glass includes one or more slits 121-1 to 121-3 formed in the folding area FA in the width direction, and each of the slits 121-1 to 121-3 includes the bridge 123 by which the slit is discontinued in the width direction. Each of the slits 121-1 to 121-3 includes at least one bridge 123. Accordingly, each of the slits 121-1 to 121-3 can have the shape of a dotted line. More specifically, in the same way as the embodiment referring to FIGS. 6A to 6C, in the still another embodiment, each of the slits 121-1 to 121-3 having a shape discontinued by at least one bridge 123 is proposed.

Each of the slits 121-1 to 121-3 can have a shape passing through the glass in the height direction, and the bridge 123 can be the glass instead of passing through the glass. The lower coating layer 110 which is the lower layer of the glass layer 120 can be formed of flexible resin, and the upper layer of the lower coating layer 110 is the glass layer 120 embodied as glass including the slits. Accordingly, when the glass is placed on the lower coating layer 110, resin which is the material of the lower coating layer 110 can be introduced into the space of each of the slits 121-1 to 121-3 in a squeezing, jetting, or pneumatic method. Accordingly, the filler 122 can be formed in the space of each of the slits 121-1 to 121-3. Meanwhile, the filler formed in the inner space of each of the slits 121-1 to 121-3 can be formed of a material different from the material of the lower coating layer 110.

Accordingly, referring to FIG. 7B illustrating the length section of the cover glass CG taken along line I-I' of FIG. 7A, glass can be located at each of the non-folding areas NFA, and the slits, the filler 122 filled in the slits 121-1 to 121-3, and the bridge 123 located between the slit 121-1 and the slit 121-3 can be located in the folding area FA. Referring to FIG. 7B, each of the slits can have a shape inclining to the length and height directions. Specifically, as illustrated in the sectional view of the cover glass of the display device 10 taken along line I-I' of FIG. 7A in the length and height directions, each of the slits 121-1 to 121-3 may not be an opening having a vertical shape in the height direction, but can be an opening having a shape inclining to the height and length directions.

Meanwhile, referring to FIG. 7C illustrating the width section of the cover glass CG taken along line II-II', each of the slits can be inclined to the width and height directions. Specifically, as illustrated in the sectional view of the cover glass of the display device 10 taken along line II-II' in the width and height directions, each of the slits 121-1 to 121-3 is not an opening having a vertical shape in the height direction, but can be an opening inclining to the height and width directions.

FIG. 8 is a view illustrating the cover glass according to a still another embodiment of the present disclosure;

Referring to FIG. 8, a sectional view of the cover glass CG according to the embodiment of the present disclosure is illustrated. FIG. 8 can be a sectional view taken in the direction of I-I' illustrated in FIG. 7A, which is the sectional view of the cover glass CG in the length and height directions.

The glass layer 120 as an upper layer of the lower coating layer 110 includes glass. In addition, the glass includes one or more slits 121-1 to 121-3 formed in the width direction in the folding area FA, and each of the slits 121-1 to 121-3 includes the bridge 123 by which the slit is discontinued in the width direction, wherein each of the slits 121-1 to 121-3 includes at least one bridge 123. Accordingly, each of the slits 121-1 to 121-3 can have the shape of a dotted line. More specifically, in the same way as the embodiment referring to FIGS. 6A to FIG. 6C, in the still another embodiment, each of the slits 121-1 to 121-3 having a shape discontinued by at least one bridge 123 is proposed.

Each of such slits 121-1 to 121-3 can have a shape passing through the glass in the height direction, and the bridge 123 can be the glass instead of passing through the glass. The lower coating layer 110 which is the lower layer of the glass layer can be made of flexible resin, and the upper layer of the lower coating layer 110 is the glass layer 120 including the slits and embodied as glass. Accordingly, when the glass is placed on the lower coating layer 110, resin which is the material of the lower coating layer 110 can be introduced into the space of each of the slits 121-1 to 121-3 in a squeezing, jetting, or pneumatic method. Accordingly, the filler 122 can be formed in the space of each of the slits 121-1 to 121-3. Meanwhile, the filler formed in the inner space of each of the slits 121-1 to 121-3 can be formed of a material different from the material of the lower coating layer 110.

According to the embodiment, each of the slits 121-1 to 121-3 can have a trapezoidal shape in the length and height directions. In addition, a trapezoid can have a shape in which the lower side of the trapezoid is longer than the upper side thereof. Due to the shape of such a slit, the out-folding characteristic of the display device 10 can further be improved. In consideration of the display panel DP placed under the lower coating layer 110, the folding characteristic of the lower side of the cover glass CG is larger than the folding characteristic of the upper side thereof. This is because the flexible filler 122 is more distributed on the lower side compared to the upper side of the glass layer 120. Accordingly, when the upper side of the cover glass is rolled, the cover glass has a larger folding characteristic and is more advantageous in the out-folding method in which the display panel DP is exposed to the outside.

FIG. 9 is a view illustrating the cover glass according to a still another embodiment of the present disclosure.

Referring to FIG. 9, a sectional view of the cover glass CG according to the embodiment of the present disclosure is illustrated. FIG. 9 can be a sectional view taken in the direction of line I-I' illustrated in FIG. 7A, which is the sectional view of the cover glass CG in the length and height directions.

The glass layer 120 as an upper layer of the lower coating layer 110 includes glass. In addition, the glass includes one or more slits 121-1 to 121-3 formed in the folding area FA in the width direction, and each of the slits 121-1 to 121-3 includes the bridge 123 by which the slit is discontinued in the width direction. Each of the slits 121-1 to 121-3 includes at least one bridge 123. Accordingly, each of the slits 121-1 to 121-3 can have a shape of a dotted line. More specifically, in the same way as the embodiment referring to FIGS. 6A to FIG. 6C, in the still another embodiment, each of the slits 121-1 to 121-3 having a shape discontinued by at least one bridge 123 is proposed.

Each of the slits 121-1 to 121-3 can have a shape passing through the glass in the height direction, and the bridge 123 can be the glass instead of passing through the glass. The lower coating layer 110 which is the lower layer of the glass layer 120 can be formed of flexible resin, and the upper layer of the lower coating layer 110 is the glass layer 120 embodied as glass including the slits. Accordingly, when the glass is placed on the lower coating layer 110, resin which is the material of the lower coating layer 110 can be introduced into the space of each of the slits 121-1 to 121-3 in a squeezing, jetting, or pneumatic method. Accordingly, the filler 122 can be formed in the space of each of the slits 121-1 to 121-3. Meanwhile, the filler formed in the inner space of each of the slits 121-1 to 121-3 can be formed of a material different from the material of the lower coating layer 110.

According to the embodiment, one or more slits 121-1 to 121-3 can have a trapezoidal shape in the length and height directions thereof. In addition, a trapezoid can have a shape in which the upper side of the trapezoid is longer than the lower side thereof. Due to the shape of such a slit, the in-folding characteristic of the display device 10 can further be improved. In consideration of the display panel DP placed under the lower coating layer 110, the folding characteristic of the upper side of the cover glass CG is larger than the folding characteristic of the lower side thereof. This is because the flexible filler 122 is more distributed on the upper side of the glass layer 120 compared to the lower side of the glass layer 120. Accordingly, when the lower side of the cover glass is rolled, the cover glass has a larger folding characteristic and is more advantageous in the in-folding method in which the display panel DP placed under the cover glass is hidden inside the cover glass.

FIG. 10 is a view illustrating the cover glass according to a still another embodiment of the present disclosure.

Referring to FIG. 10, a sectional view of the cover glass CG according to the embodiment of the present disclosure is illustrated. FIG. 10 can be a sectional view taken in the direction of I-I' illustrated in FIG. 7A, which is the sectional view of the cover glass CG in the length and height directions.

The glass layer 120 as an upper layer of the lower coating layer 110 includes glass. In addition, the glass includes one or more slits 121-1 to 121-3 formed in the folding area FA in the width direction, and each of the slits 121-1 to 121-3 includes the bridge 123 by which the slit is discontinued in the width direction. Each of the slits 121-1 to 121-3 includes at least one bridge 123. Accordingly, each of the slits 121-1 to 121-3 can have a shape of a dotted line. More specifically, in the same way as the embodiment referring to FIGS. 6A to 6C, in the still another embodiment, each of the slits 121-1 to 121-3 having a shape discontinued by at least one bridge 123 is proposed.

Each of such slits 121-1 to 121-3 can have a shape passing through the glass in the height direction, and the bridge 123 can be the glass instead of passing through the cover glass. The lower coating layer 110 which is the lower layer of the glass layer can be formed of flexible resin, and the upper layer of the lower coating layer is the glass layer 120 embodied as glass including the slits. Accordingly, when the glass is placed on the lower coating layer 110, resin which is the material of the lower coating layer 110 can be introduced into the space of each of the slits 121-1 to 121-3 in a squeezing, jetting, or pneumatic method. Accordingly, the filler 122 can be formed in the space of each of the slits 121-1 to 121-3. Meanwhile, the filler formed in the inner space of each of the slits 121-1 to 121-3 can be formed of a material different from the material of the lower coating layer 110.

According to the embodiment, each of one or more slits 121-1 to 121-3 can have an hourglass shape in the length and height directions. In addition, the hourglass shape can have a shape, the length width of which decreases from the top of the hourglass to a middle thereof and increases from the middle to the bottom of the hourglass. Due to the shape of such a slit, the in-folding characteristic and the out-folding characteristic of the display device 10 can be simultaneously improved. In consideration of the display panel DP placed under the lower coating layer 110, the folding characteristic of the upper side of the cover glass CG and the folding characteristic of the lower side of the cover glass CG are larger than the folding characteristic of the middle side of the cover glass CG. This is because the flexible filler 122 is more distributed on the upper and lower sides compared to the middle side of the glass layer 120. Accordingly, when the upper side of the cover glass is rolled and when the lower side of the cover glass is rolled, the cover glass has a larger folding characteristic, and is more advantageous both in the in-folding method in which the display panel DP placed under the cover glass is hidden inside the cover glass and in the out-folding method in which the display panel DP is exposed to the outside.

Those skilled in the art to which the present disclosure pertains will understand that the display device of the present disclosure can be embodied in other specific forms without changing the technical spirit or essential features of the present disclosure. Therefore, it should be understood that the embodiments described above are illustrative in all respects and not restrictive. It should be interpreted that the scope of the present disclosure is indicated by the claims to be described later rather than by the above detailed description, and all changes or modifications derived from the meaning and scope of the claims and their equivalent concepts are included in the scope of the present disclosure.

What is claimed is:

1. A display device comprising:
a display panel; and
a cover glass disposed on the display panel and comprising a folding area and a non-folding area,
wherein the cover glass comprises:
a glass layer comprising a glass having slits disposed in the folding area, the slits extending in a width direction of the glass, a filler filled in each of the slits, and each of the slits extending through opposite sides of the glass layer;

a lower coating layer disposed under the glass layer and on the display panel; and an upper coating layer disposed on the glass layer, wherein each of the slits has a parallelepiped shape that is inclined in a height direction and a length direction of the parallelepiped shape to tilt toward a same first side of the glass layer and inclined in a height direction and a width direction of the parallelepiped shape to tilt toward a same second side of the glass layer that is perpendicular to the first side of the glass layer, the parallelepiped shape having six faces including two rectangle shaped faces and four parallelogram shaped faces, wherein a first pair of parallelogram shaped faces among the four parallelogram shaped faces are disposed on opposite sides of the parallelepiped shape in the width direction and a second pair of parallelogram shaped faces among the four parallelogram shaped faces are disposed on opposite sides of the parallelepiped shape in the length direction, wherein material of the lower coating layer is introduced into the slits so that the filler is formed, wherein the lower coating layer is formed of a transparent material and comprises an adhesive component, wherein the lower coating layer has a transmittance of 80% or more, a reflectance of 20% or less, and a refractive index of 1.45 to 1.55, wherein the upper coating layer has a transmittance of 80% or more, a reflectance of 20% or less, and a refractive index of 1.45 to 1.55, and wherein a distance between one of the slits and a slit adjacent thereto in a length direction of the glass is in a range of 0.5 mm to 10 mm.

2. The display device of claim 1, wherein the filler is formed of a flexible material.

3. The display device of claim 1, further comprising:
at least one bridge disposed between two adjacent slits among the slits.

4. The display device of claim 1, wherein the display device is configured to fold in opposite directions.

5. The display device of claim 3, wherein a width of each of the slits in a length direction of the glass is approximately 10 mm or less,
a width of the bridge in the width direction is approximately 1.0 mm or less, and
a distance between the bridge and a bridge adjacent thereto in the width direction is approximately 15 mm or less.

6. The display device of claim 1, wherein the lower coating layer is formed of a flexible material,
the filler is formed of a same material as a material of the lower coating layer.

7. The display device of claim 1, wherein the filler has a transmittance of 80% or more, a reflectance of 20% or less, a refractive index of approximately 1.45 to 1.55, and an elongation rate of 30% or more, and
wherein each of the lower coating layer and the upper coating layer has an elongation rate of 30% or more.

8. The display device of claim 1, further comprising:
an upper film disposed on the upper coating layer,
wherein the upper film has a thickness of approximately 0.15 mm or less and is a material based on a PET or PI.

9. The display device of claim 1, wherein each of the slits has a non-symmetrical shape relative to a vertical axis of the corresponding slit.

10. A display device comprising:
a display panel;
a cover glass disposed on the display panel and including a folding area and a non-folding area, the cover glass including slits extending through the cover glass and filler disposed in each of the slits;
a lower coating layer disposed between the cover glass and the display panel;
an upper coating layer disposed on the cover glass, the cover glass being disposed between the upper coating layer and the lower coating layer; and
at least one bridge disposed between two adjacent slits among the slits, the at least one bridge including a portion of the cover glass,
wherein the slits include at least two rows of slits offset from each other,
wherein a thickness of the lower coating layer is 100 μm or less, a thickness of the cover glass is 70 μm or more, and a thickness of the upper coating layer is 100 μm or less,
wherein each of the slits has a width of 0.3 mm in a length direction of the cover glass, a length of 15 mm or less in a width direction of the cover glass perpendicular to the length direction, and a depth of 70 μm or more,
wherein a width of the at least one bridge disposed between the two adjacent slits is 0.5 mm or less in the width direction of the cover glass,
wherein the filler in each of the slits has a refractive index of 1.45 to 1.55,
wherein each of the slits has a parallelepiped shape that is inclined in a height direction and a length direction of the parallelepiped shape to tilt toward a same first side of the cover glass and inclined in a height direction and a width direction of the parallelepiped shape to tilt toward a same second side of the cover glass that is perpendicular to the first side of the cover glass, the parallelepiped shape having six faces including two rectangle shaped faces and four parallelogram shaped faces, and
wherein a first pair of parallelogram shaped faces among the four parallelogram shaped faces are disposed on opposite sides of the parallelepiped shape in the width direction of the parallelepiped shape and a second pair of parallelogram shaped faces among the four parallelogram shaped faces are disposed on opposite sides of the parallelepiped shape in the length direction of the parallelepiped shape,
wherein material of the lower coating layer is introduced into the slits so that the filler is formed,
wherein the lower coating layer is formed of a transparent material and comprises an adhesive component,
wherein the lower coating layer has a transmittance of 80% or more, a reflectance of 20% or less, and a refractive index of 1.45 to 1.55,
wherein the upper coating layer has a transmittance of 80% or more, a reflectance of 20% or less, and a refractive index of 1.45 to 1.55, and
wherein a distance between one of the slits and a slit adjacent thereto in a length direction of the cover glass is in a range of 0.5 mm to 10 mm.

11. The display device of claim 10, wherein the upper coating layer, the filler and the lower coating layer include a same material.

12. The display device of claim 10, wherein each of the slits has a non-symmetrical shape relative to a vertical axis of the corresponding slit.

\* \* \* \* \*